(12) United States Patent
Tongue et al.

(10) Patent No.: US 12,292,353 B2
(45) Date of Patent: May 6, 2025

(54) CALCULATING DISTRIBUTED TWIST OF A MULTI-FIBER 3D SHAPE SENSOR BUNDLE (MFB) USING OPTICAL FREQUENCY DOMAIN REFLECTOMETRY (OFDR) PHASE INTERROGATION DATA

(71) Applicant: The Shape Sensing Company, Austin, TX (US)

(72) Inventors: Alex Tongue, Dripping Springs, TX (US); Justin Braun, Austin, TX (US); Pierrick Vulliez, Santa Barbara, TX (US)

(73) Assignee: The Shape Sensing Company, Austin, TX (US)

( * ) Notice: Subject to any disclaimer, the term of this patent is extended or adjusted under 35 U.S.C. 154(b) by 0 days.

(21) Appl. No.: 18/437,067

(22) Filed: Feb. 8, 2024

(65) Prior Publication Data
US 2025/0027839 A1 Jan. 23, 2025

Related U.S. Application Data

(60) Provisional application No. 63/483,939, filed on Feb. 8, 2023.

(51) Int. Cl.
*G01B 11/24* (2006.01)
*G01M 11/00* (2006.01)

(52) U.S. Cl.
CPC ..... *G01M 11/3172* (2013.01); *G01B 11/2441* (2013.01)

(58) Field of Classification Search
CPC ............ G01M 11/3172; G01B 11/2441
See application file for complete search history.

(56) References Cited

U.S. PATENT DOCUMENTS

| | | | |
|---|---|---|---|
| 6,868,195 B2 | 3/2005 | Fujita | |
| 7,781,724 B2 | 8/2010 | Childers et al. | |
| 8,400,620 B2 | 3/2013 | Froggatt et al. | |
| 8,531,655 B2 | 9/2013 | Klein et al. | |

(Continued)

FOREIGN PATENT DOCUMENTS

WO 2001033165 A1 5/2001

*Primary Examiner* — Jamil Ahmed
(74) *Attorney, Agent, or Firm* — SoCal IP Law Group LLP; Angelo J. Gaz; Steven C. Sereboff

(57) ABSTRACT

MFB twist distribution data is calculated along a multi-fiber shape sensor bundle (MFB) using optical frequency domain reflectometry (OFDR) phase interrogation data. Phase data is extracted from OFDR interferometric interrogation data acquired from an MFB having single core radially offset fibers with fiber Bragg gratings (FBGs) helically wrapped about and rigidly adhered to a central single core fiber with BRFs. A change in phase between current and previously acquired phase signals is calculated for the fibers. The change in phase is unwrapped and FBG gap-induced unwrapping discontinuities are accounted for in the change in phase. The FBG gap-mitigated phase differences are determined for each of the offset fibers and then averaged. The center fiber gap-mitigated phase difference is subtracted from the average to yield a twist-phase difference. Bending-induced changes are removed to create bend-compensated twist-phase difference distribution which is used to calculate the MFB twist distribution data along the MFB.

15 Claims, 23 Drawing Sheets

(56) References Cited

U.S. PATENT DOCUMENTS

| | | |
|---|---|---|
| 8,773,650 B2 | 7/2014 | Froggatt et al. |
| 9,784,569 B2 | 10/2017 | Froggatt et al. |
| 10,551,173 B2 | 2/2020 | Froggatt et al. |
| 10,663,290 B1 | 5/2020 | Tongue et al. |
| 10,775,157 B2 | 9/2020 | Gifford et al. |
| 10,782,121 B2 | 9/2020 | Marsden et al. |
| 10,921,117 B2 | 2/2021 | Froggatt et al. |
| 11,002,533 B1 * | 5/2021 | Tongue ................ G01B 11/245 |
| 11,162,782 B2 | 11/2021 | Marsden et al. |
| 11,535,438 B2 | 12/2022 | Brenkus et al. |
| 2021/0131796 A1 | 5/2021 | Froggatt et al. |
| 2022/0404114 A1 | 12/2022 | Lee et al. |

* cited by examiner

CALCULATING DISTRIBUTED TWIST OF A MULTI-FIBER 3D SHAPE SENSOR BUNDLE (MFB) USING OPTICAL FREQUENCY DOMAIN REFLECTOMETRY (OFDR) PHASE INTERROGATION DATA

RELATED APPLICATION INFORMATION

This patent claims priority from U.S. provisional patent application No. 63/483,939 entitled "MEASURING DISTRIBUTED TWIST OF A MULTI-FIBER 3D SHAPE SENSOR VIA OPTICAL FREQUENCY DOMAIN REFLECTOMETRY PHASE INTERROGATION DATA" filed Feb. 8, 2023, the entire content of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

Determination of multi-fiber bundle (MFB) twist distribution data of an MFB 3D shape sensor using optical frequency domain reflectometry (OFDR) phase interrogation data.

Description of the Related Art

Fiber optic position and/or shape sensing devices generally include a multicore optical fiber (MOF) for determining position and shape of an object. The multicore optical fiber, in turn, typically includes at least two cores encompassed in a common cladding, positioned in a relative relationship to one another and spaced apart from each other to reduce mode coupling distortions between the fiber cores. Such devices further include an interrogator that transmits light to, and receives reflected light from, the MOF.

However, MOF shape-sensing devices have several shortcomings. First, a MOF can be relatively difficult to couple to an interrogator and require both the MOF and the interrogator to have specialized coupling components. Second, typical MOF exhibits minimal sensitivity to twist. Third, MOFs that feature fiber Bragg gratings (FBGs) have the FBGs on each core emplaced in the same relative location and aligned with each other—due to the process by which FBGs are incorporated into the multiple cores of such MOFs during their manufacture—and thus gaps between FBGs are also aligned and thereby define areas for which the MOF cannot monitor. Fourth, compared to single-core optical fibers, MOFs are substantially more expensive to manufacture and very costly to customize from the sole and ubiquitous MOF design universally available today (i.e., where producing any variation would be very expensive if even possible). Finally, most MOF-based sensing solutions utilize wavelength division multiplexing (WDM) which limits the number of FBGs and, in turn, limits sensing precision.

Figure 1:
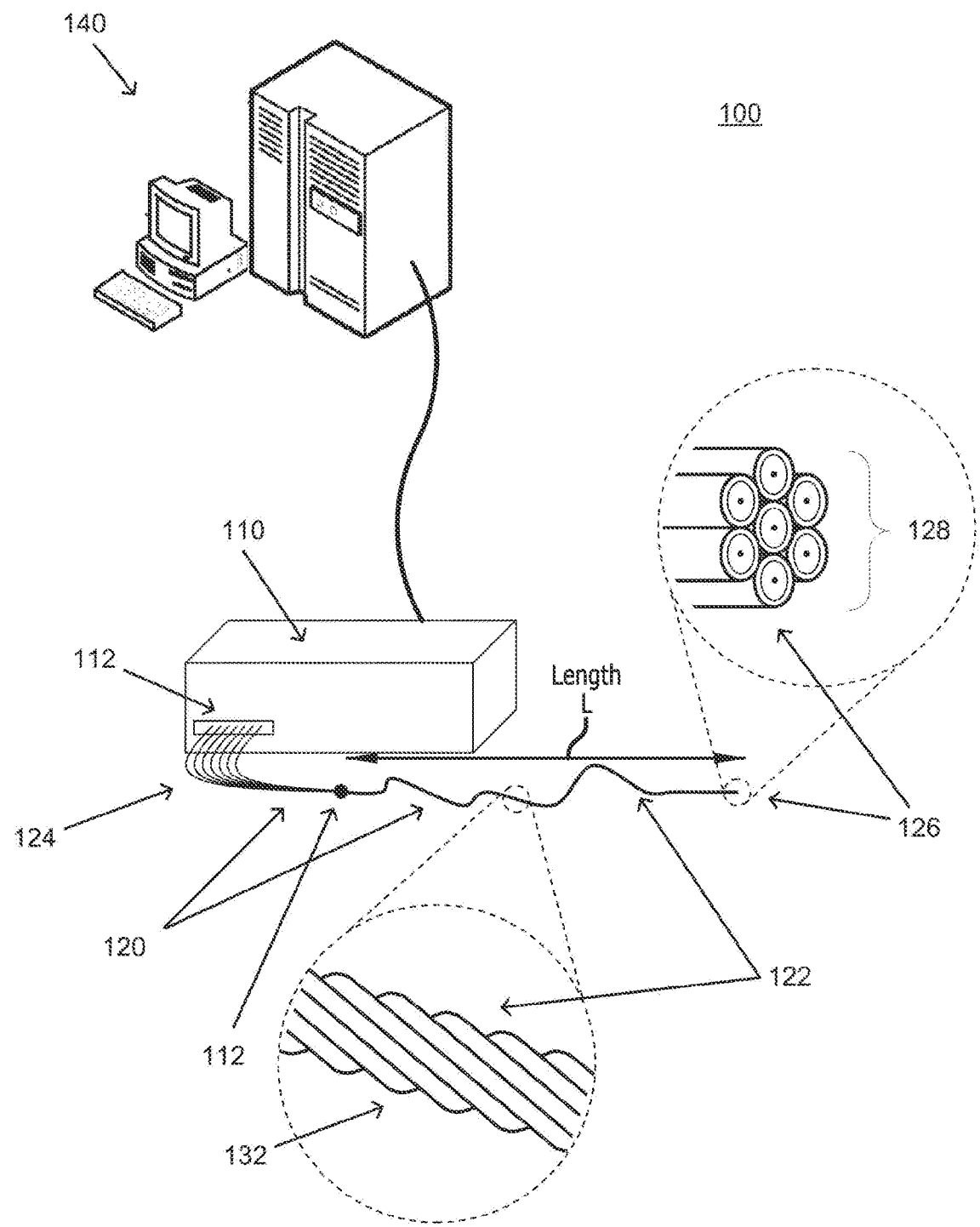
FIG. 1 illustrates a shape sensing device.

Throughout this description, elements appearing in figures are assigned three-digit reference designators, where the most significant digit is the figure number, such as where the element is first introduced, and the two least significant digits are specific to the element. An element that is not described in conjunction with a figure may be presumed to have the same characteristics and function as a previously-described element having a reference designator with the same least significant digits.

DETAILED DESCRIPTION

Structural devices and objects can undergo shape changes when exposed to certain environments or conditions, in which case it may be beneficial to know the degree of such shape changes in order to adapt to or compensate for such changes. For this purpose, a fiber optic sensor embedded in or attached to the structure may monitor the dynamic shape or relative position of the structure and, in certain instances, may do so without inaccuracies being introduced due to temperature or load effects. In a similar manner, the specific state of intentionally flexible structures may be determined at any point in time by measuring the dynamic shape of such structures at such time.

Fiber optic sensors utilize one or more fiber optic components to measure shape changes. Compared to other sensors, fiber optic sensors are particularly useful in smart structures, health monitoring, and other applications because of their relatively small size, low cost, multiplexing capabilities, immunity to electromagnetic interference and vibration, intrinsic safety, and ability to be embedded within or attached to many types of structures operating in a variety of different physical conditions.

Fiber Optic Sensing

Fiber optic sensing enables precise measurement of full strain fields, phase signals, load distributions, temperature distributions, and other parameters, and thus is becoming pervasive across multiple industries including manufacturing, mechanical, medical, automotive, aerospace and energy.

For "intrinsic" fiber optic sensing—where the fiber optic cable itself is the sensor—changes in a light signal are measured as the signal moves down an optical fiber's waveguide. These optical sensors can measure temperature, strain, twist, pressure, and other parameters by monitoring the resulting changes in the intensity, phase, polarization, wavelength and/or transit time of light within the fiber. Sensors that vary the reflected wavelength of light based on strain phase signals and/or temperature within the fiber are the simplest to measure as only one source and detector are required. These fiber optic sensors can also provide distributed sensing along the entire length of the fiber.

Fiber optic sensors of this kind typically use one of two techniques—based on natural "scattering" or based on use of "fiber Bragg gratings" (FBGs)—for analyzing the changes in the way the light reflects in the optical fiber's waveguide and making calculations with this information to provide accurate measurements. However, each technique has advantages and disadvantages. For example, scattering techniques offer fully distributed data points along a fiber using naturally occurring random imperfections in the fiber optic cable, but this dependence on natural imperfections is limited as such imperfections are rarely optimal for such purposes. FBGs, on the other hand, can also be fully distributed but only by using a fiber having continuously inscribed FBGs which can be difficult and costly to produce. Nevertheless, because FBGs are purposefully fabricated as well-defined sensors—and thus are much more optimal than imperfections that occur naturally—FBGs have a much higher signal-to-noise ratio and are therefore much more reliable, which in turn enables FBG "interrogators" (the data acquisition hardware) to obtain precise measurements when using continuously inscribed FBGs. Specifically, FBGs use periodic perturbations in refractive index inscribed into the optical fiber to reflect only a specific wavelength of light (described further below), and strain, twist and temperature changes cause spectral shifts in the reflected wavelength which are detectable by an interrogator. Stated differently, FBGs exhibit periodic variations in the fiber's index of refraction (the speed of light within the fiber) such that a single FBG consists of a finite length of fiber which contains these perturbations and the entire FBG acts as a wavelength selective mirror. As such, most fiber optic sensing systems on the market today use FBGs to reflect light back to an interrogator.

By operating as wavelength selective mirrors, FBGs reflect a single specific wavelength of light and transmit all others, and the wavelength reflected by the FBG is referred to as the "Bragg wavelength". When an FBG (and the optical fiber in which it is located) is stretched, compressed, twisted and/or undergoes changes in temperature, the Bragg wavelength (i.e., the reflected wavelength) changes. The interrogator—using a demodulation technique—can observe this change in the wavelength and translate it into strain, phase and/or temperature measurements based on the relationship between mechanical strain, phase, twist, temperature change, and the resulting Bragg wavelength. Notably, FBGs have inherent sensitivity to both mechanical strain, twist and temperature change, so it is not just the thermal expansion (mechanical) which gives sensitivity to temperature, but also some optical properties change as well, which have an affect on the Bragg wavelength. Each array of FBGs contained within a single fiber may require a single reference reflector located on a second fiber "arm" whereby the single fiber gets split into two fibers such that one of the two splits contains the array of FBGs and the other split arm contains a single reference reflector. This setup would then be copied for each array which must be interrogated, such as each individual sensing fiber contained in a 3-dimensional (3D) shape sensing bundle or a multi-fiber shape sensor bundle (MFB).

Both scattering and FBG technologies use various demodulation techniques—used to obtain and make calculations with the optical signal provided by the sensors—with wavelength division multiplexing (WDM) being the most common for FBG-based optical sensors. However, optical frequency domain reflectometry (OFDR) offers significant advantages over WDM in many circumstances, primarily because OFDR technology can utilize an order-of-magnitude more sensors on a single fiber than WDM. Optical time domain reflectometry (OTDR) may also provide advantages in certain circumstances.

In WDM systems each FBG must reflect a different Bragg wavelength. Because laser light includes only a finite number of distinguishable wavelengths, WDM systems are limited to the number of sensors they can interrogate on a single fiber. Furthermore, in WDM the range of potentially reflected wavelengths for each FBG cannot be too close to those used by another FBG in the same optical fiber because one FBG under strain could shift so much as to reflect the same wavelength as another grating (strained or unstrained) and thereby render the data indistinguishable as to the FBG source (making the data unusable).

In contrast, in OFDR systems each FBG reflects the same wavelength where the return reflections are measured for changes in wavelength as a function of modulation frequency and that can be plotted as indicators of fiber length corresponding to the locations of each FBG (even among a continuous array of FBGs). In this manner, OFDR is able to provide spatially continuous information along one or more fibers (while WDM cannot), making OFDR well-suited for applications that require spatially continuous monitoring of strain, phase, temperature, stress, distributed loads, twist and/or shape-changes in real-time. And because OFDR allows each FBG to reflect the same wavelength, there is no limit on the total number of FBG sensors incorporated into an optical fiber (enabling continuous arrays of FBGs) that are used to provide spatially continuous measurements along the optical fiber. Indeed, the measurement distance for such FBG sensors is only limited by the coherence length of the tunable light source.

Accordingly, one approach for achieving continuous measurements using an optical fiber (e.g., to collect fully distributed strain, phase and temperature data) is to inscribe FBGs continuously along the entire length of the optical fiber. The FBGs must be incorporated into the core of the optical fiber when the optical fiber is manufactured or written through the coating post-manufacturing. The FBGs then act as miniscule mirrors in the core of the optical fiber. As a light-based signal travels down the optical fiber, each FBG reflects a portion of the signal back to the system. The system recognizes changes in the returning signal and makes calculations with this information to provide accurate strain, phase and temperature measurements. As such, when an FBG optical fiber is bonded to a material and interrogated with light, the FBGs will reflect different wavelengths and phase as the fiber is strained concurrent with the material onto which it is bonded.

Multicore Optical Fiber

Fiber optic position and/or shape sensing devices generally include a multicore optical fiber for determining position and shape of an object. Multicore optical fiber includes two or more cores within a common cladding, positioned in relative relationship to one another, and spaced apart from each other to reduce mode coupling (i.e., distortions) between the fiber cores. Such devices further include an interrogator that transmits light to, and receives reflected light from, the multicore optical fiber.

A multi-fiber bundle (MFB) such as a multi-fiber shape sensor bundle is a helically twisted bundle of at least three single-core optical fibers wrapped around a single-core central fiber. Such an MFB can be used when calculating MFB twist distribution data along a multi-fiber shape sensor bundle (MFB) using optical frequency domain reflectometry (OFDR) phase interrogation data.

The bundle may be rigidly bonded with an adhesive to form a unitary multi-fiber bundle ("rigidly" meaning where all fibers in the multi-fiber bundle deform together due to a change in position or shape). In this MFB configuration—and because each fiber has its own core, cladding, and coating—the fiber cores are spaced apart and separated from each other such that mode coupling between the fiber cores is substantially eliminated. By definition, in structure, in operation and in output, an MFB and a multicore optical fiber (MOF) are very different.

An interrogator may be coupled to each individual optical fiber in order to obtain data associated with each of the multiple fiber segments of each individual optical fiber and, collectively, all of the fiber segments of all of the optical fibers. This data, in turn, can then be used to determine a strain parameter and/or phase signal for the core of each of the multiple fiber segments and, based on predetermined baseline strain parameters for each fiber in the multi-fiber bundle, information regarding shape (including position and bend as well as twist) of a portion of the multi-fiber may also be determined. These determinations, in turn, enable the strain parameters and/or phase signals to be converted into local shape measurements defining shape in the multi-fiber bundle at a particular location along the bundle that represent a change in position, bend, or twist. A particular side effect and enhanced benefit to the multi fiber bundle (MFB) is that the center core can be used to get a larger twist signal in a different way compared to the traditional straightforward approaches (such as those based on MOF designs).

Description of Apparatus

FIG. 1 illustrates a representative shape sensing device (SSD) 100 for calculating MFB twist distribution data along the MFB using OFDR phase data of the interrogation data. In FIG. 1, the shape sensing device 100 includes a multi-fiber (shape sensing) bundle (MFB) 120 operationally coupled to an interrogator 110 (or "reflectometer") via an integrated connection interface (ICI) 112 (which may be or include comm interface 1030). In a general sense, the interrogator 110 may include a laser and an optical network. The interrogator 110 may also include an OFDR, an optical time domain reflectometer (OTDR), or both (among other options such as those based on WDM for example), and/or any other device suitable for processing light signals received from the MFB 120 to produce interrogation data with regard to shape sensing as known and appreciated by skilled artisans. The interrogator 110, in turn, may be operationally coupled to a special-purpose computing system 140 capable of make calculations with the interrogation data to determine position, bend, and/or twist of the MFB and/or presenting this information to an end-user.

With specific regard to the interrogator 110, optical transduction may be utilized that involves monitoring the reflected FBG wavelength and correlating that information to strain, phase and/or temperature, and where the sensitivity of the Bragg wavelength to strain, phase and temperature is derived independently. Changes in the FBG length and optical properties due to changes in strain, phase and/or temperature result in changes to the Bragg wavelength of the FBG. In this manner, mechanical strain, phase and temperature can be measured directly—based on changes to the Bragg wavelength of the FBG—and various temperature compensation techniques can then be employed to decouple these measurements.

In FIG. 1, MFB 120 further includes a helically-twisted 132 main section 122 for shape sensing (including detecting shape, position, bend, and/or twist), an interrogator-side unbonded section 124 for coupling to the integrated connection interface 112, and a terminal portion 126 constituting the terminus of the main section 122 and the MFB 120 opposite the unbonded section 124. The MFB may also include optional boundary reinforcement 112 at the boundary between the helically-twisted 132 main section 122 and the unbonded section 124. As shown in FIG. 1, the main section 122 may include single-core optical fibers 128, and these optical fibers 128 may be rigidly bonded such that all fibers in the MFB 120 deform together due to a change in position, shape, bend or twist of the MFB 120.

The MFB 120 may include a set of seven single-core optical fibers 128 and these single-core optical fibers 128 may be arranged such that, from the boundary between the rigidly bonded helically-twisted main section 122 and the unbonded section 124 to the terminal portion 126, one fiber runs linearly through the center of the MFB 120 while the remaining six fibers are helically twisted 132 around and bonded to the center fiber.

The use of Bragg gratings, Bragg wavelengths, strain and temperature for generating interrogation data of an MFB can each be used to calculate curvature, bending direction and twist of the MFB. In some cases, phase can be used in addition to these techniques, and replace a very small subset of the calculations within strain to calculate twist of an MFB. Phase can be calculated from the same optical interrogation data as strain, but they can be and use separate calculations (e.g., see FIG. 22). Strain data can be used to calculate curvature, bending direction and twist of the MFB.

Interrogator 110 and/or system 140 may be for or be part of a system for calculating MFB twist distribution data along an MFB using OFDR phase data of interrogation data. This calculating may be or include measuring and/or determining MFB twist distribution data along a multi-fiber 3D shape sensor bundle using OFDR phase interrogation data. Also, MFB 120 or other MFBs herein may be considered a 3D shape sensing bundle or a 3D MFB shape sensor.

System 100 may be a fiber optic shape-sensing system having optical fibers helically twisted and rigidly bonded to form a linearly-running MFB 120 for calculating position, bend and twist of the shape-sensing MFB 120, wherein each optical fiber has a single core. Interrogator 110 is operationally coupled to MFB 120 and is for transmitting light to, and receiving reflected light from the MFB 120 to produce interrogation data. Interrogator 110 includes inputs each of which is operationally coupling with each of the optical fibers of MFB 120. Computing system 140 is operationally coupled to the interrogator 110 and is for calculating MFB twist distribution data along the MFB using OFDR phase data of the interrogation data. Calculating the MFB twist distribution data may include making calculations with the phase difference data of each of the optical fibers over time using the OFDR phase data to determine the MFB twist distribution data. Calculating the MFB twist distribution data might not include calculating position or bend using the phase difference data of the interrogation data. The OFDR difference phase data might not include intensity, polarization, wavelength or transit time of light in each of the optical fibers; or calculating might not include using interrogation data having intensity, polarization, wavelength or transit time of light for the optical fibers. Interrogator 110 may be configured to produce the OFDR interferometric interrogation data while inputting a laser that scans a frequency range into the MFB, which is a multi-fiber 3D shape sensor bundled. MFB 120 can be integrated into a guidewire that is configured to be registered to and visualized with anatomical imaging to display in real-time a location and shape of the guide wire within a patient; and the location and shape may be used for feedback control of robotically controlled medical devices.

An array of FBGs can be disposed within the core of each single-core optical fiber from among the single-core optical fibers, where: a) at least a subset of FBGs from among the FBGs in at least one optical fiber from among the optical fibers overlaps a subset of gaps between FBGs from among the FBGs in at least one other optical fiber from among the optical fibers, b) at least a subset of FBGs from among the FBGs in each optical fiber from among the optical fibers overlaps a subset of gaps between FBGs from among the FBGs for each of the other optical fiber from among the optical fibers in the shape-sensing bundle, or c) the array of FBGs disposed within the core of each single-core optical fiber comprises a single elongated FBG running the entire length of a shape-sensing region of the shape-sensing bundle. The optical fibers may comprise at least seven optical fibers with a first fiber running linearly and six other optical fibers helically twisted around and rigidly adhered to the first fiber, and the first optical fiber remains centrally-positioned with respect to the six other optical fibers. The optical fibers may have at least three optical fibers that are helically twisted around each other to form a triple-helix strand running linearly.

Device 100, interrogator 110 and/or system 140 can perform process 2100, process 2200 and/or other appropriate actions herein for calculating MFB twist distribution data along the MFB using OFDR phase data of the interrogation data. The MFB twist distribution data or distributed twist may be or include the cross sectional rotation of the sensor due to torsional deformation relative to an initial, untwisted state. This MFB twist distribution data may be a calculation along part of or along the entire length L or FIG. 1's main section 122 for shape sensing. It may exclude the interrogator-side unbonded section 124.

Figure 2A:
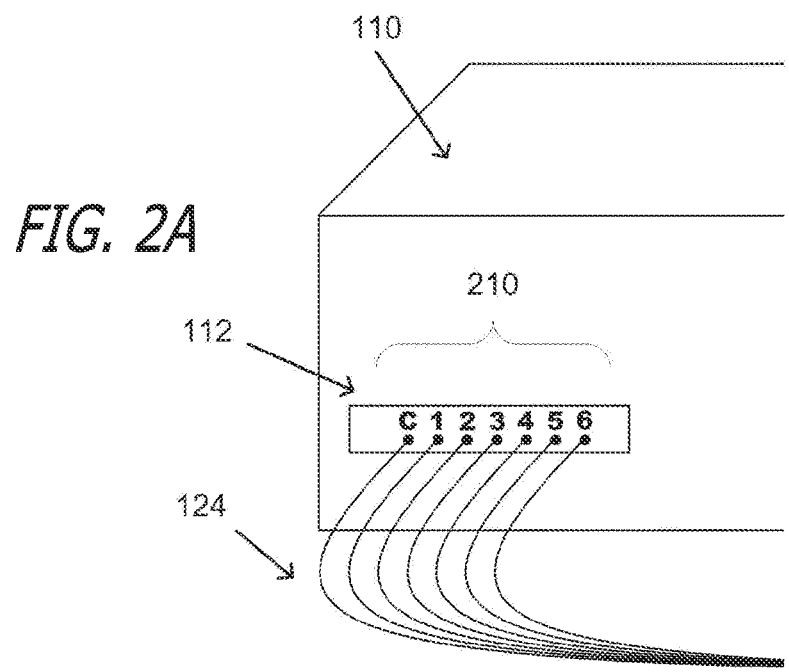
FIG. 2A illustrates the integrated connection interface (ICI) of the interrogator shown in FIG. 1.

FIG. 2A illustrates the integrated connection interface (ICI) 112 of the interrogator 110 shown in FIG. 1. In FIG. 2A, the ICI 112 includes optical fiber engagement points 210 where each point is capable of operationally coupling with the core of a single-core optical fiber. Each engagement point 210 may be designated for a specific single-core optical fiber from unbonded section 124 of the MFB 120, and may also be designated or labeled accordingly such that, for example, the engagement point for the central-running optical fiber might be labeled as "C" while the six other points corresponding to the other six optical fibers helically twisted and surrounding the central-running optical fiber may be numbered, by way of example, in a clockwise fashion as "1", "2", "3", "4", "5", and "6" accordingly (in reference to the MFB 120 illustrated in FIG. 2B and described below). Moreover, the ICI 112 may further include an additional engagement point (not shown) for interfacing with an additional single-core optical fiber or other sensor for temperature determinations along the MFB 120 or for other purposes (described later herein).

Figure 2B:
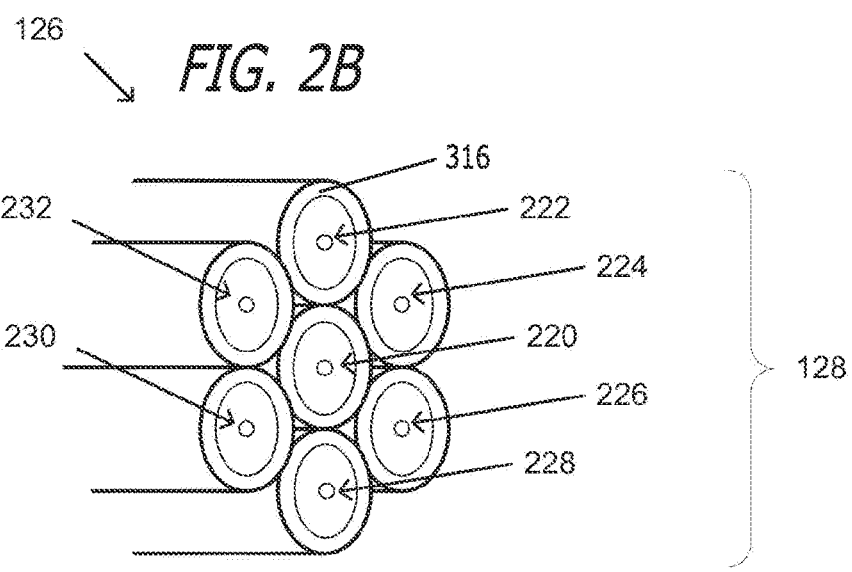
FIG. 2B illustrates the terminal portion of the main section of the multi-fiber bundle (MFB).

FIG. 2B illustrates the terminal portion 126 of the main section 122 of the MFB 120 providing a representative cross-section of the MFB 120. In FIG. 2B, the MFB 120 includes a optical fibers 128 which are shown to be seven single-core optical fibers including one central optical fiber 220 running linearly through the MFB 122 and enclosed within the other six additional optical fibers 222, 224, 226, 228, 230, and 232, the latter of which (as shown in FIG. 1) are helically twisted 132 around the central-running optical fiber 220.

Figure 3A:
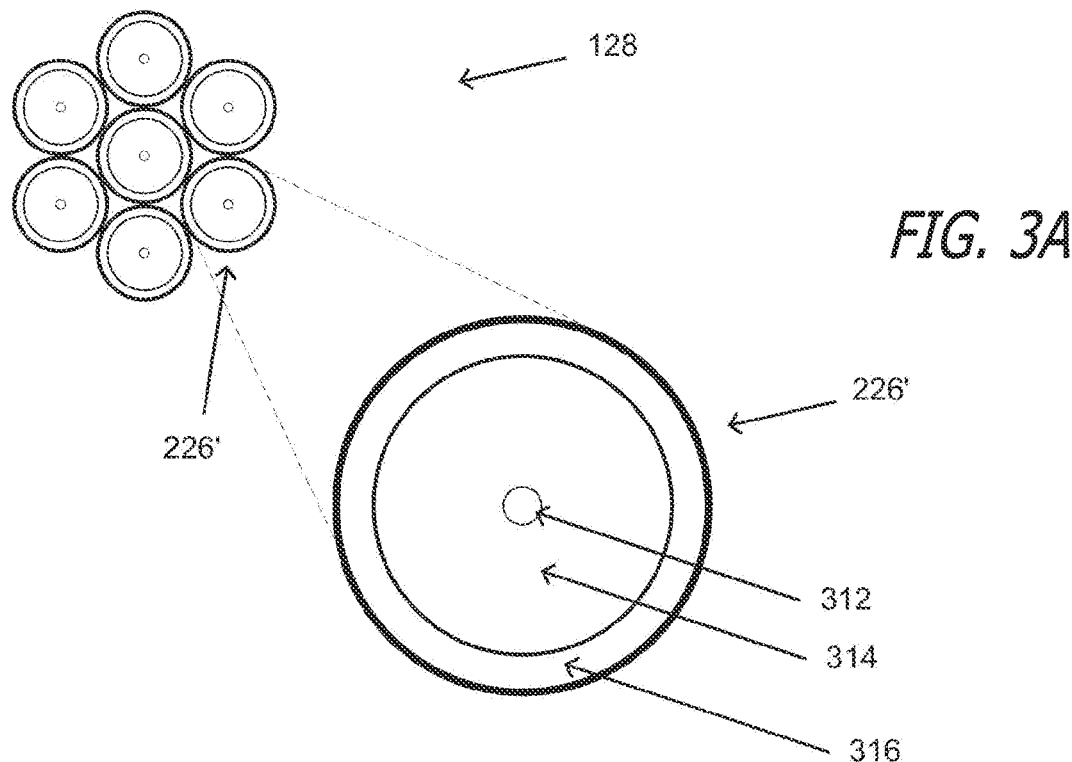
FIG. 3A illustrates the composition of a single-core optical fiber.

FIG. 3A illustrates the composition of a representative single-core optical fiber 226' from among the optical fibers 128 including the main section 122 of the MFB 120. In FIG. 3A, the single-core optical fiber 226' includes a core 312, cladding 314, and a coating 316. The core and cladding may be both made from silica glass, although the optical properties of each differ. Specifically, the refractive index of the core—which describes the speed at which light travels through a material—is slightly increased during the manufacturing process in order to form the waveguide that enables light to be transmitted over long distances in the core with very low attenuation. The outermost layer, the coating, is applied to the outside of the cladding to increase the robustness of the fiber while protecting the exterior of the cladding from mechanical damage and contaminants, such as dirt and moisture. For strain and/or phase sensing applications, this coating must be sufficiently stiff in order to provide a load path for strain, twist and/or phase to transfer into the core. These three primary layers of the optical fiber structure are depicted in FIG. 3A. For additional environmental protection, fiber may be encased within auxiliary buffer tubes or jackets to form a fiber optic cable, otherwise known as a "patch cord". In a typical patch cord, the optical fiber is packaged in a tight buffer jacket and loosely incorporated into an outer jacket filled with strength members such as Kevlar® strands.

Figure 3B:
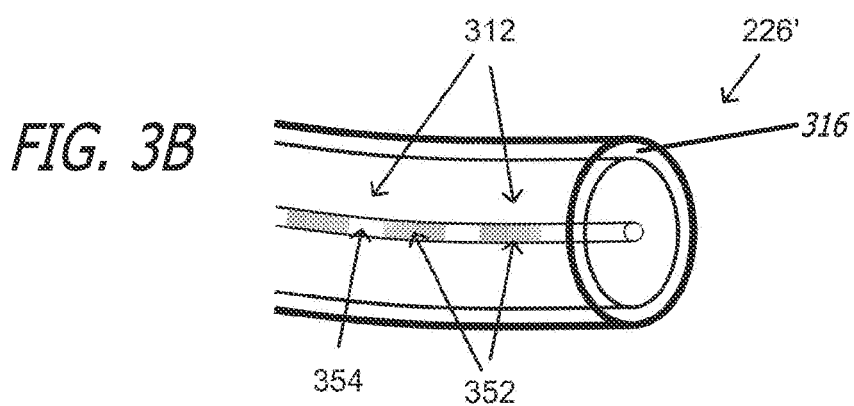
FIG. 3B further illustrates the composition of a single-core optical fiber.

FIG. 3B further illustrates the composition of a representative single-core optical fiber 226' from among the optical fibers 128 including the main section 122 of the of the MFB 120. In FIG. 3B, the core 312 of the single-core optical fiber 226' further includes FBGs 352 separated by inter-FBG gaps 354.

Figure 4A:
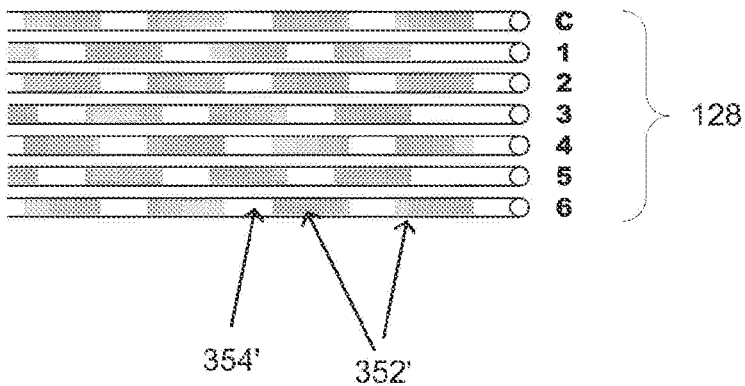
FIG. 4A represents an arrangement of gap-overlapping FBGs.

FIG. 4A shows a representative arrangement of gap-overlapping FBGs corresponding to the optical fibers 128 including an MFB 120. In FIG. 4A, each single-core optical fiber (labeled C, 1, 2, 3, 4, 5, 6) including a FBGs such that the central fiber (C) and the three even-numbered helical fibers (i.e., 2, 4, 6) have fully overlapping FBGs that also fully overlap the gaps of the odd-numbered helical fibers (i.e., 1, 3, 5), and vice versa, such that the gaps between FBGs in any optical fiber have at least three FBGs in other fibers overlapping the gaps. The odd-numbered fibers (i.e., 1, 3, 5) are arranged in a triangular orientation for three-dimensional sensing, as so are the even numbered fibers (i.e., 2, 4, 6).

Figure 4B:
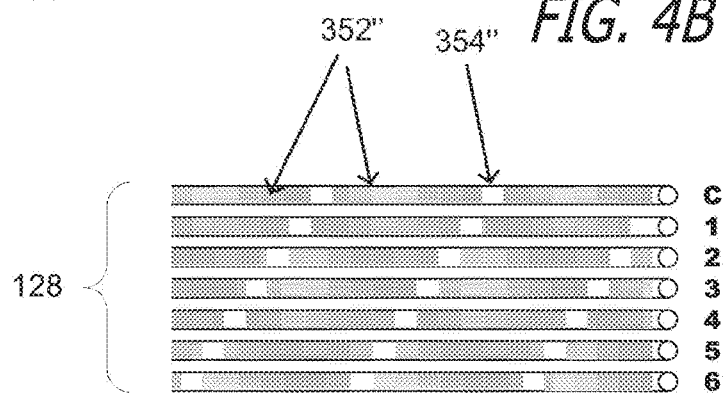
FIG. 4B represents an arrangement of highly-prolific gap-overlapping fiber Bragg gratings.

FIG. 4B shows a representative arrangement of highly-prolific gap-overlapping FBGs corresponding to an unwrapped view of the optical fibers 128 including an MFB 120 of various implementations disclosed herein. In FIG. 4B, each single-core optical fiber (labeled C, 1, 2, 3, 4, 5 and 6) including a long FBGs 352" and relatively short gaps 354" such that every gap in each of the single-core optical fibers (labeled C, 1, 2, 3, 4, 5, 6) are fully overlapped by FBGs in the other fibers, and vice versa, such that the gaps between FBGs in any optical fiber has six FBGs in the other fibers overlapping the gaps.

Figure 5A:
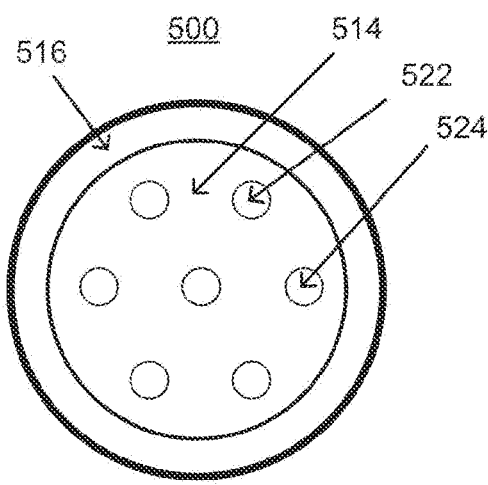
FIG. 5A illustrates a prior art multicore optical fiber (MOF).
Figure 5B:
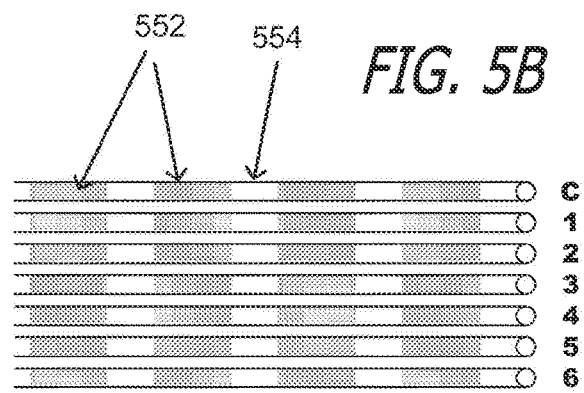
FIG. 5B represents an unwrapped view of the plurality of optical fibers including the prior art MOF of FIG. 5A.

In contrast, FIG. 5A (together with FIG. 5B) illustrates a prior art multicore optical fiber 500 which lacks the gap-overlapping FBG feature of FIGS. 4A and 4B, and FIG. 5B represents an unwrapped view of the optical fibers including the prior art MOF of FIG. 5A but lacking the gap-overlapping feature of FIGS. 4A and 4B.

As shown in FIG. 5A, the MOF 500 includes a plurality of cores (e.g., cores 522 and 524) encompassed in a common cladding 514 which, in turn, is covered with an exterior coating 516. Each of the plurality of cores also includes a series of FBGs (not shown). Coating 516 may be optional.

In FIG. 5B, each core (labeled C, 1, 2, 3, 4, 5, 6) of the MOF 500 includes a FBGs 552 and inter-FBG gaps 554. As illustrated, the gaps 554 fully overlap each other, which is typical of MOF (a limitation of manufacturing MOF), and thus no sensing occurs in the MOF 500 at the locations corresponding to each set of gaps.

In lieu of one or more of the single-core optical fibers in the MFB, MOFs may be included with appropriate adaptations being made to, e.g., the ICI 112 of the interrogator 110 and so forth.

Figure 6A:
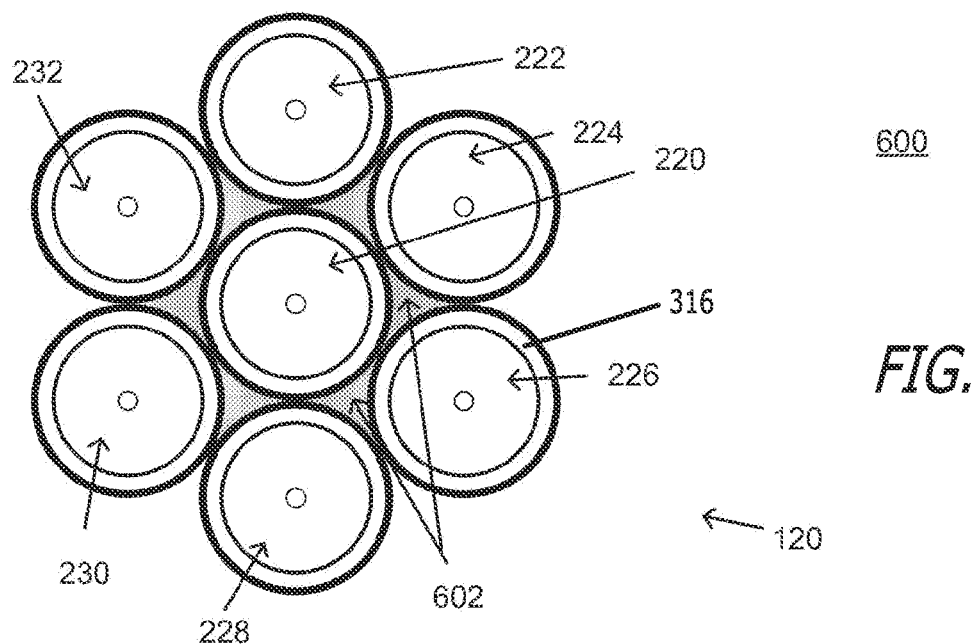
FIG. 6A illustrates a cross-section of a first helically-twisted multi-fiber bundle.

FIG. 6A illustrates a cross-section of a first helically-twisted multi-fiber bundle 600 including the MFB 120 of FIG. 1 and its single-core optical fibers 220, 222, 224, 226, 228, 230, 232 but further including a first configuration of adhesive 602, combination of adhesives, or other suitable material(s) (collectively referred to herein simply as "adhesives"). In FIG. 6A, the adhesive 602 is entirely confined to the interior of the bundle, surrounding the linearly-running central optical fiber 220 and engaging each of the helically twisted optical fibers 222, 224, 226, 228, 230, 232 (and each other) but only within the spaces interior to the MFB 600 as shown. In this manner, the adhesive 602 is not substantially visible from the exterior of the bundle except at an end of the main section 122, e.g., at the terminal portion 126 of the MFB, and possibly at the boundary between the main section 122 and the unbonded section 124 as shown in FIG. 1.

Figure 6B:
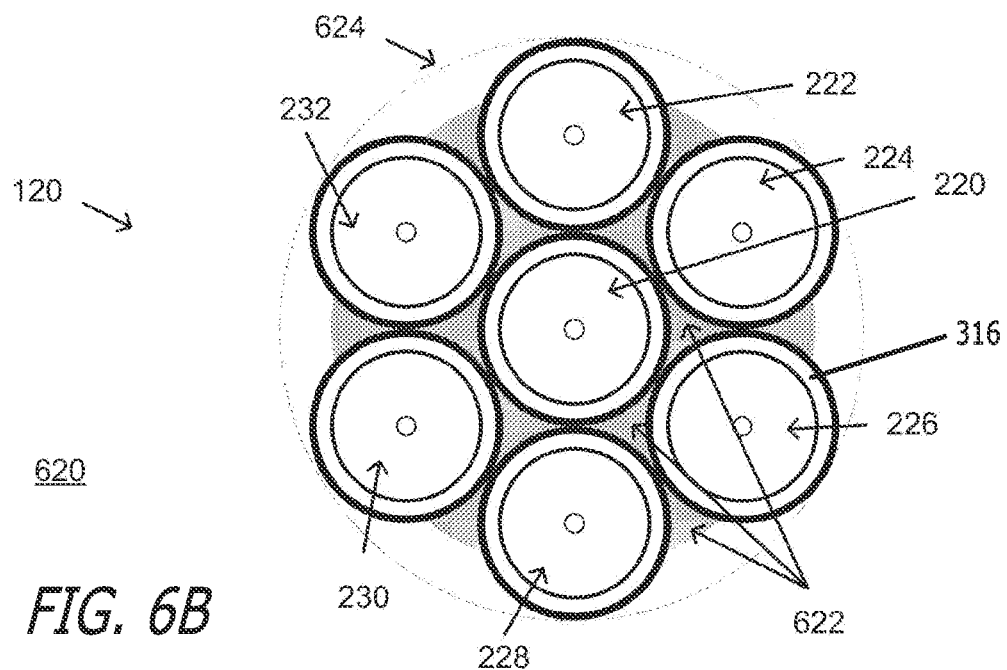
FIG. 6B illustrates a cross-section of a second helically-twisted multi-fiber bundle.

FIG. 6B illustrates a cross-section of a second helically-twisted multi-fiber bundle 620 including the MFB 120 of FIG. 1 and its single-core optical fibers 220, 222, 224, 226, 228, 230, 232 but further including a second configuration of adhesive 622. In FIG. 6B, the adhesive 622 extends beyond the interior of the bundle, surrounding the linearly-running central optical fiber 220 and engaging each of the helically twisted optical fibers 222, 224, 226, 228, 230, 232 (and each other) both within the spaces interior to the MFB 620 and beyond the points the helically twisted optical fibers 222, 224, 226, 228, 230, and 232 engage or contact each other but not so as to entirely encompass these fibers or to extend beyond the radius 624 of the outmost exterior surface created by these fibers as indicated by the dashed line 624 in FIG. 6B. In this manner, the adhesive 602 is visible from the exterior of the bundle along with the helically twisted optical fibers 222, 224, 226, 228, 230, 232.

Figure 6C:
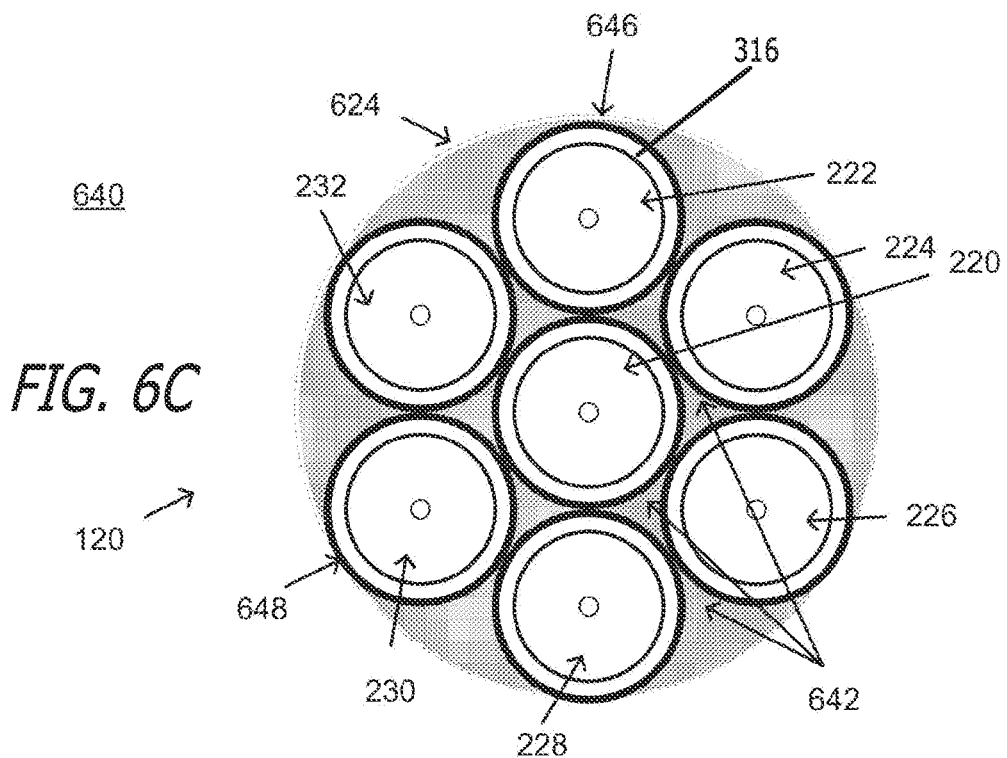
FIG. 6C illustrates a cross-section of a third helically-twisted multi-fiber bundle.

FIG. 6C illustrates a cross-section of a third helically-twisted multi-fiber bundle 640 including the MFB 120 of FIG. 1 and its single-core optical fibers 220, 222, 224, 226, 228, 230, and 232 but further including a third configuration of adhesive 642. In FIG. 6C, the adhesive 642 extends beyond the interior of the bundle, surrounding both the linearly-running central optical fiber 220 and the helically twisted optical fibers 222, 224, 226, 228, 230, 232 but within the radius 624 of the outmost exterior surface created by the exterior fibers as indicated by the dashed line in FIG. 6C as shown. In this manner, the adhesive 642 includes most (if not all) of the visible exterior of the bundle except to the extent that the radially outermost portions of the helically twisted optical fibers 222, 224, 226, 228, 230, 232 might also remain visible at, for example, visibility points 646, 648 where the adhesive 642 is thinnest at the points where the helically twisted optical fibers 222, 224, 226, 228, 230, 232 extend to the radius 624 as shown in the figure. Notably this third configuration of adhesive 642 provides the bundle 640 with a relatively smooth exterior surface and substantially obscures visibility of the helical twist.

Figure 6D:
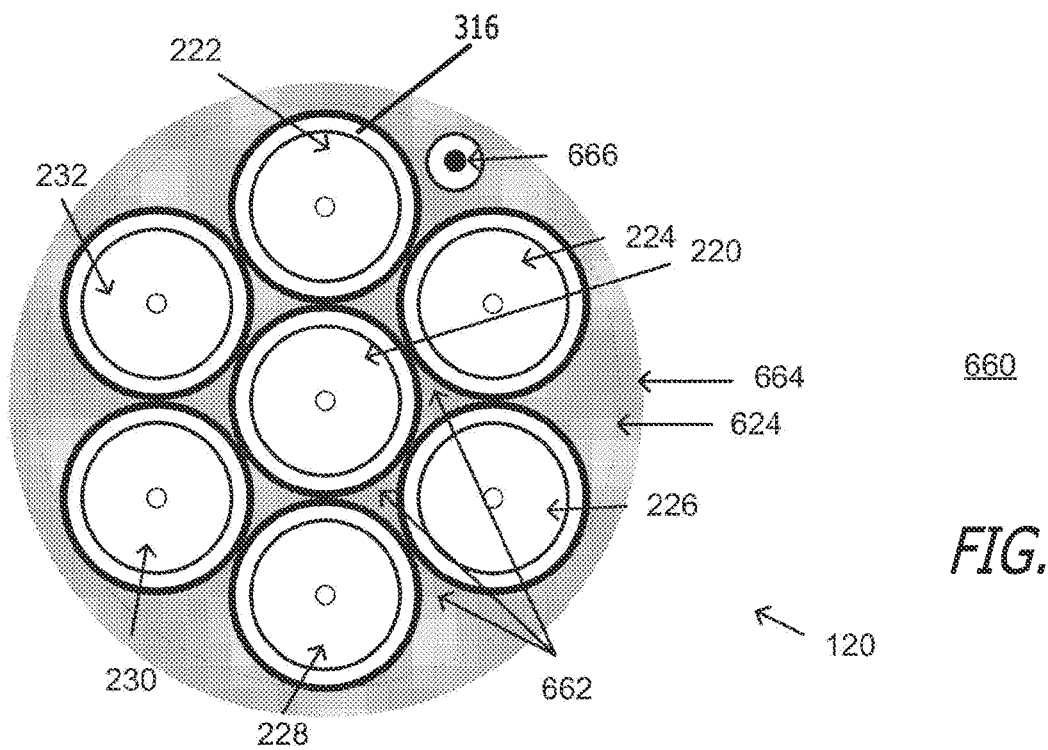
FIG. 6D illustrates a cross-section of a fourth helically-twisted multi-fiber bundle.

FIG. 6D illustrates a cross-section of a fourth helically-twisted multi-fiber bundle 660 including the MFB 120 of FIG. 1 and its single-core optical fibers 220, 222, 224, 226, 228, 230, 232 but further including a fourth configuration of adhesive 662. In FIG. 6D, the adhesive 662 extends beyond (as exterior surface 664) the radius 624 of the outmost exterior surface created by the exterior fibers 222, 224, 226, 228, 230, 232 as indicated by the dashed line in the figure as shown. In this manner, the adhesive 662 includes the entire visible exterior of the bundle (as exterior surface 664) as shown in the figure. Notably this fourth configuration of adhesive 662 provides the bundle 660 with a relatively smooth exterior surface and obscures visibility of the helical twist, providing a measure of additional protection to the helical fibers, as well as additional room for the inclusion of other component features. For example, a free-floating temperature-detecting fiber 666 is incorporated into the adhesive 662 to provide temperature measurements unaffected by bending and/or twisting of the MFB 120. This free-floating temperature-detecting fiber 666 may be (a) an additional optical fiber having its own core, cladding, and coating (akin to optical fibers 220, 222, 224, 226, 228, 230, 232 but free-floating unlike these other optical fibers), (b) a different type of fiber suitable (i.e., different from the optical fibers) for temperature detection that does not need to be free-floating and instead could be fixably integrated into the adhesive 662, or (c) a different type of fiber (i.e., different from the optical fibers) suitable for temperature detection that is free-floating within the adhesive 662 as shown in the figure. The temperature sensing fiber may be a standard fiber with coating, cladding and core and be free floating outside of the MFB or it can be free floating within a channel in the adhesive (i.e., embedded but still free floating). While the addition of other components is also possible in the second and third configurations of FIG. 6B and FIG. 6C, respectively, the fourth configuration of FIG. 6D may better accommodate larger components than the other configurations, especially when the additional components are to be fully encapsulated within the adhesive.

Figure 7:
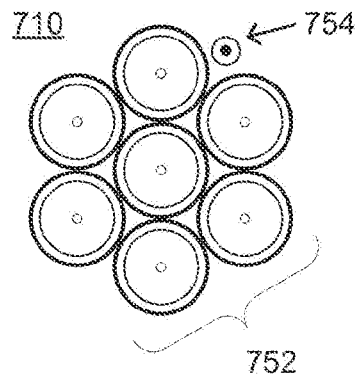
FIG. 7 illustrates a plurality of different configurations for helically-twisted single-core optical fiber bundles.
Figure 7:
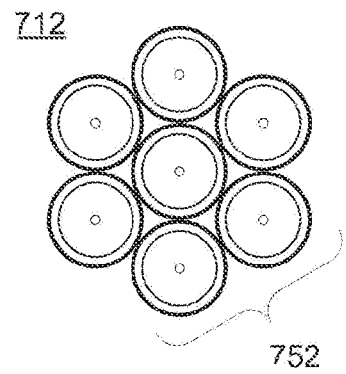
Figure 7:
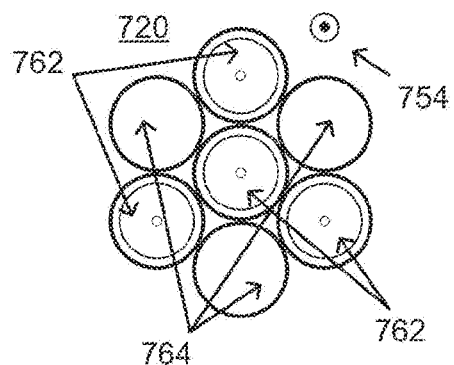
Figure 7:
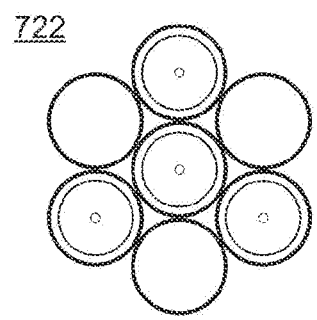
Figure 7:
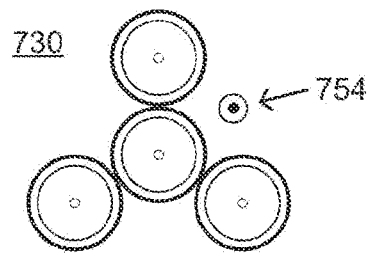
Figure 7:
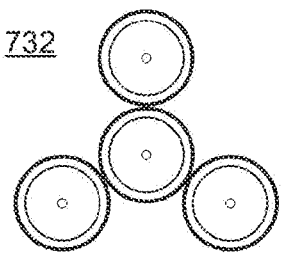
Figure 7:
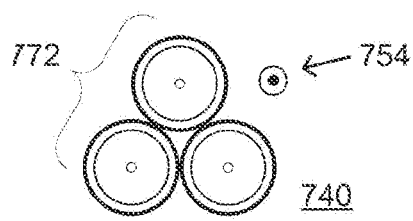
Figure 7:
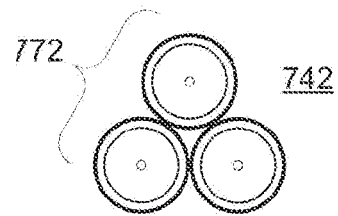

Different configurations of helically-twisted bundles of single-core optical fibers for sensing purposes are disclosed. FIG. 7 illustrates a different configurations for helically-twisted single-core optical fiber bundles. In FIG. 7, a first configuration 710 ("7/7+T bundle") includes seven helically-twisted single-core optical fibers 752 in the arrangement shown, including one linearly-running central fiber encompassed by six helically-twisted fibers, plus a free-floating temperature-detecting fiber 754. Relative to the other seven configurations shown in this FIG. 7, this first configuration 710 is most bulky but generally provides the most robust position, shape, bend and/or twist detection by measuring the stretch and compression of the single-core optical fibers 752 and separately measuring temperature without the effects of stretch and compression because the temperature-detecting fiber 754 is free-floating and thus does not stretch or compress when the bundle undergoes shape changes.

A second configuration 712 ("7/7 bundle") includes seven optical fibers 752 in the arrangement shown, including one linearly-running central fiber encompassed by six helically-twisted fibers (but with no free-floating temperature-detecting fiber). Although shape sensing by this configuration 712 may not be as robust as the first configuration 710 yet having a similar bulk/thickness, this second configuration 712 may be cheaper and easier to produce (because of the lack of a free-floating temperature-sensing fiber) and may still provide robust position, shape, bend and/or twist detection by measuring the stretch and compression of the seven single-core optical fibers 752. In this configuration, temperature influence can be compensated for algorithmically without need for being measured directly or extrapolated from these optical fibers 752.

A third configuration 720 ("4/7+T bundle") includes four optical fibers 762 and three "dummy fibers" 764 (from which measurements are not obtained) in the arrangement shown, including one linearly-running central fiber encompassed by six helically-twisted fibers (alternating between single-core optical fibers and dummy fibers as shown), plus a free-floating temperature-detecting fiber 754. Although shape sensing by this third configuration 720 may not be as robust as the seven-fiber configurations 710 and 712, this third configuration 720 may still provide robust position, shape, bend and/or twist detection by measuring the stretch and compression of the four single-core optical fibers 762 and separately measure temperature without the effects of stretch and compression using the free-floating temperature-detecting fiber 754.

A fourth configuration 722 ("4/7 bundle") includes the same arrangement of four optical fibers and three "dummy fibers" as the third configuration 720 but without a free-floating temperature-detecting fiber. Although shape sensing by this fourth configuration 722 may not be as robust as the third configuration 720, this fourth configuration 722 may be cheaper and easier to produce (because of the lack of a free-floating temperature-sensing fiber) and may still provide robust position, shape, bend and/or twist detection by measuring the stretch and compression of the four single-core optical fibers. In this configuration, temperature influence can be compensated for algorithmically without need for being measured directly or extrapolated from these fibers.

A fifth configuration 730 ("4/4+T bundle") includes substantially the same arrangement as the third configuration 720 but without the dummy fibers 764 and still performs substantially the same the third configuration 720.

A sixth configuration 732 ("4/4 bundle") includes substantially the same arrangement as the fourth configuration 722 but without the dummy fibers 764 (and still lacking the free-floating temperature-sensing fiber) and still performs substantially the same the fourth configuration 722.

A seventh configuration 740 ("3/3+T bundle") includes three helically-twisted single-core optical fibers 772 in the arrangement shown plus a free-floating temperature-detecting fiber 754. Relative to the previous six configurations shown in this FIG. 6, this seventh configuration 740 is least bulky, most flexible, and relatively inexpensive to produce but generally provides the least robust position, shape, bend and/or twist detection and is most computationally expensive because of the more limited data available (making more extrapolation of that data necessary).

An eighth configuration 742 ("3/3 bundle") includes substantially the same arrangement as the seventh configuration 740 but without the free-floating temperature-sensing fiber), making it both least costly and least robust but, because of the helical twist of its single-core optical fibers, is still capable of position, shape, bend and/or twist detection albeit at a higher computational cost.

Figure 8:
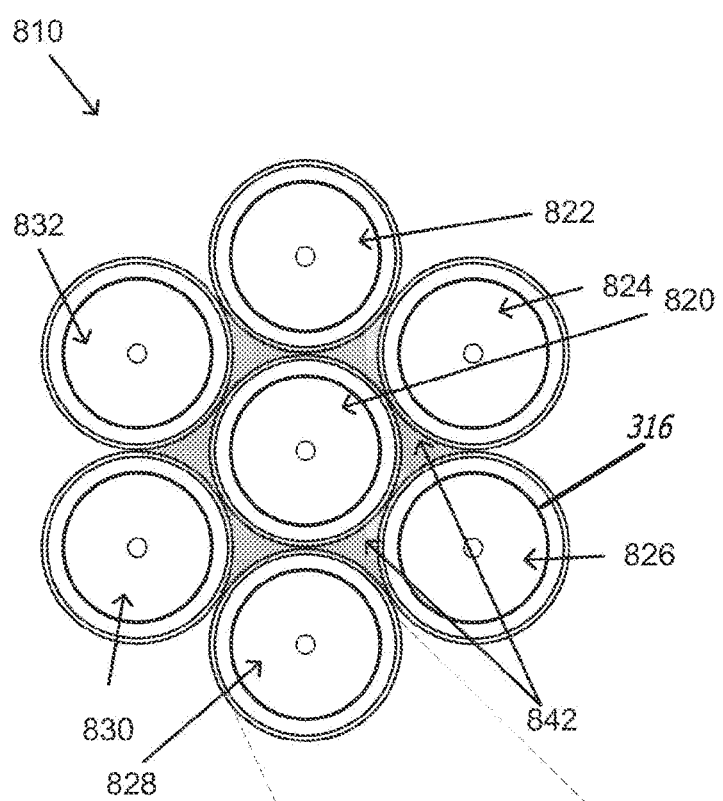
FIG. 8 illustrates a helically-twisted bundle of single-core optical fibers.
Figure 8:
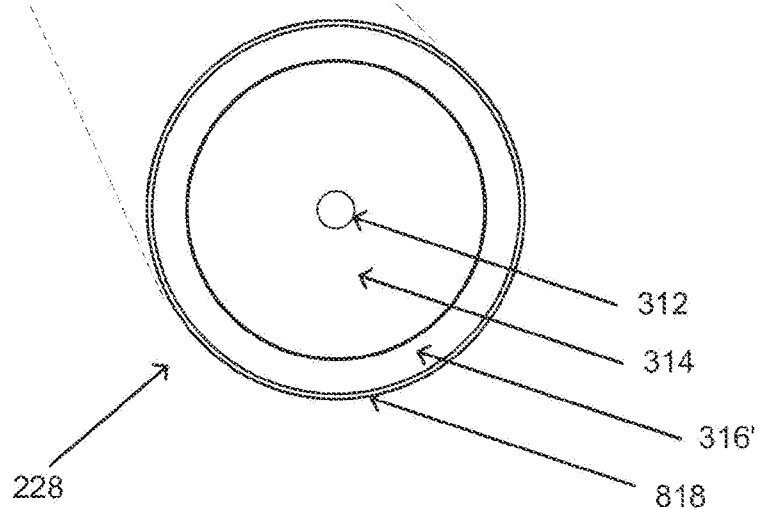

FIG. 8 illustrates a helically-twisted bundle 810 of single-core optical fibers 820, 822, 824, 826, 828, 830, 832 each including a second coating 818. In FIG. 8, the single-core optical fibers 820, 822, 824, 826, 828, 830, 832 each include a second coating 818 in addition to the first coating 316', cladding 314 and core 312. Furthermore, the single-core optical fibers 820, 822, 824, 826, 828, 830, 832 are bound together by adhesive 842 which may bond especially well with the second coating 818 of the optical fibers in a manner that enhances shape sensing or for any other purpose.

Figure 9A:
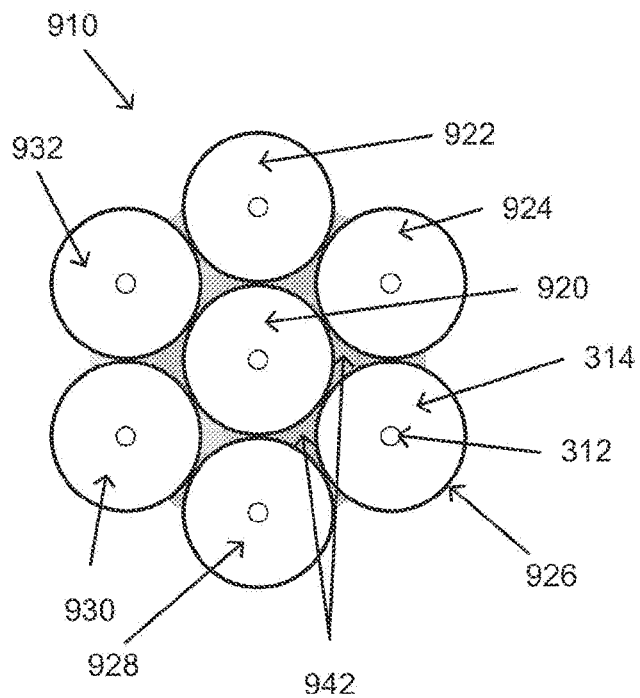
FIG. 9A illustrates a helically-twisted bundle of single-core optical fibers.

FIG. 9A illustrates a helically-twisted bundle 910 of single-core optical fibers 920, 922, 924, 926, 928, 930, 932 each lacking any coating. In FIG. 9A, each of the single-core optical fibers 920, 922, 924, 926, 928, 930, 932 includes a core 312 and cladding 314 but no coating such that fibers are disposed in cladding-to-cladding contact with each other (e.g., the linearly-running central fiber 920 is in contact with the other fibers 922, 924, 926, 928, 930, 932) notwithstanding the adhesive 942 (if any) used to rigidly bind together the fibers. In any event, the coating-less single-core optical fibers 920, 922, 924, 926, 928, 930, 932 may be bound together by adhesive 942 which may bond especially well with the cladding of the optical fibers in a manner that enhances shape sensing or for any other purpose.

Figure 9B:
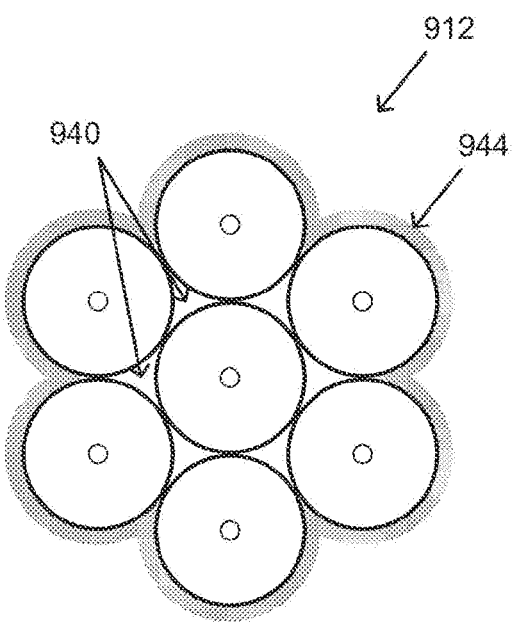
FIG. 9B illustrates a helically-twisted bundle of single-core optical fibers.

FIG. 9B illustrates a helically-twisted bundle 912 of single-core optical fibers 920, 922, 924, 926, 928, 930, 932 each lacking any coating and bound together by a form-fitting external covering 944. In FIG. 9B, each of the single-core optical fibers 920, 922, 924, 926, 928, 930, 932 includes a core 312 and cladding 314 but no coating such that fibers are disposed in cladding-to-cladding contact with each other (e.g., the linearly-running central fiber 920 which is in contact with the other fibers 922, 924, 926, 928, 930, 932), especially in the absence of any adhesive used to rigidly bind together the fibers in the spaces interior to the bundle 940 (as shown), although an adhesive 942 may be used to fill in these interior spaces 940. Regardless, the bundle 912 of coating-less single-core optical fibers 920, 922, 924, 926, 928, 930, 932 may be bound together by a form-fitting external covering (or bundle-coating) 944 which may bond especially well with the out-facing cladding of the helically-twisted optical fibers in a manner that enhances shape sensing or for any other purpose. The form-fitting external covering may include adhesive.

Figure 9C:
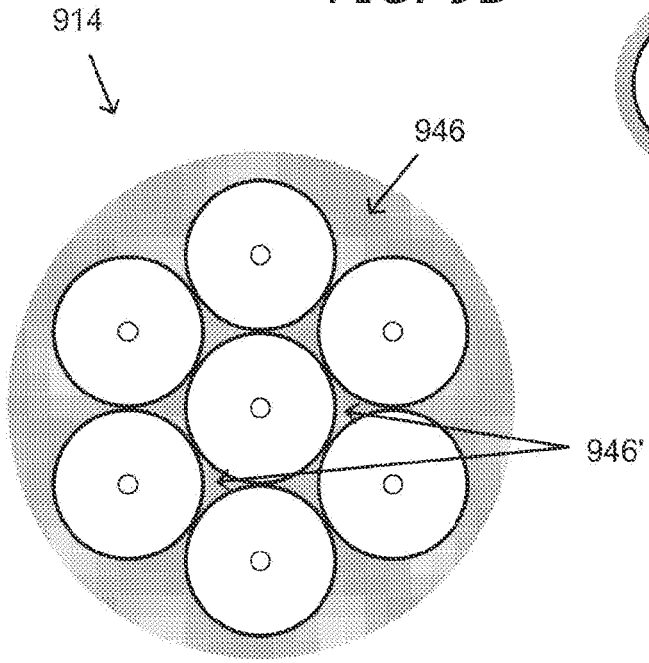
FIG. 9C illustrates a helically-twisted bundle of single-core optical fibers.

FIG. 9C illustrates a helically-twisted bundle 914 of single-core optical fibers 920, 922, 924, 926, 928, 930, 932 each lacking any coating and bound together by a smooth covering 946. In FIG. 9C, each of the single-core optical fibers 920, 922, 924, 926, 928, 930, 932 includes a core 312 and cladding 314 but no coating such that fibers are disposed in cladding-to-cladding contact with each other (e.g., the linearly-running central fiber 920 which is in contact with the other fibers 922, 924, 926, 928, 930, 932), especially in the absence of any adhesive used to rigidly bind together the fibers in the spaces interior to the bundle 940 (as per FIG. 9B), but notwithstanding any adhesive 946 that might be used to form the external covering 946, including portions thereof 946' in the interior spaces 940 used to rigidly bind together the fibers. An adhesive 946 for these interior spaces 940 (shown as 946') may be used, as well as for the smooth coating 946 for the bundle 914. Regardless, the bundle 914 of coating-less single-core optical fibers 920, 922, 924, 926, 928, 930, and 932 may be bound together by a smooth external covering (or bundle-coating) 946 and which may bond especially well with the cladding of the helically-twisted optical fibers in a manner that enhances shape sensing or for any other purpose.

Core, cladding, and coating dimensions may vary while providing sufficient strain, phase and/or temperature data for calculations herein. These will likely range from cladding diameters of 50 to 125 microns, coated diameters of 55 to 155 microns, and core diameters of 5 to 10 microns. In some cases, descriptions related to MFB 120 may be substituted by another MFB herein.

One of the many benefits of the multifiber bundle approach (especially when compared to existing multicore fiber) is that additional sensitivity that arises due to a coupling between two different types of deformation. Specifically, multicore fiber—while exhibiting different optical properties within the cross section—is homogeneous from a mechanical deformation point of view which leads it to behave more like a steel rod with regard to bend and/or twist detection. This distinction is important because deformations caused by bending, stretching, twisting and thermal changes can be applied separately and independently using MOF, and none of these deformations necessarily depends on (or even affects) any other source or type of deformation. As such, in a multifiber bundle there is coupling between twisting deformations and axial deformations such that a twist in one direction or the other causes the entire MFB to elongate or compress (depending on the direction of twist) which is in addition to the normal twist deformation that occurs. Stated differently, while twisting in a multicore fiber can only be detected as a shear strain deformation, twisting in a multifiber bundle causes axial elongation or compression in addition to the shear strain that are both detectable by an MFB, such as using strain and/or phase signal data from fibers of the MFB.

As a result, the "shear strain" detectable by multicore fiber is on the order of 1-2 microstrain units whereas shear strain detectable by a multifiber bundle is on the order of 5-25 microstrain units. Furthermore, the axial strain in caused by the MFB coupling effect in particular may be as high as 100-200 microstrain units. This larger strain detection for the same amount of twist makes twist detection of an MFB easier and more accurate and a substantial improvement over MOF solutions.

One way to extract the twist distribution of a multi-fiber bundle or multicore fiber/MOF is through the strain measurements taken from the constitutive fibers/cores. Strain data can be input into elementary mechanics models to yield the twist distribution. However, the signal-to-noise ratio of the strain-derived twist signal is very low and makes accurate sensing of twist difficult or impossible, or it requires sensor geometry that is not possible or useful in a surgical medical field, such as geometry that is too large and/or not flexible enough for that afield. Also, using strain to derive twist may fail based on a quick assessment of the elementary mechanics involved that indicates that the signal noise ratio (SNR) is to low for it to be practical. Twist sensing on a fiber optic shape sensor in the surgical field can work more accurately than using strain or an MOF by using phase from an MFB.

In addition, another distinctive feature of MFB is the ability to tune the twist sensitivity by utilizing different rates of twist when manufacturing the helix structure, which is relatively simple to control and adds no cost. In contrast, multicore fiber manufacturers universally produce a helix having about 50 turns per meter, and changing this rate of twist for multicore fiber would be extremely expensive due to the lack of flexibility in drawing prototype fibers, or impossible because unintended optical side effects would occur (due to the cores of a multicore fiber existing within a single fiber). Furthermore, avoiding optical crosstalk in multicore fibers may be a major design consideration contributing to the standardized 50-turns-per-meter universally utilized in multicore fiber, whereas optical crosstalk is completely avoided by multifiber bundles and thus MFBs do not suffer from any such manufacturing limitations.

Computing Environment

Figure 10:
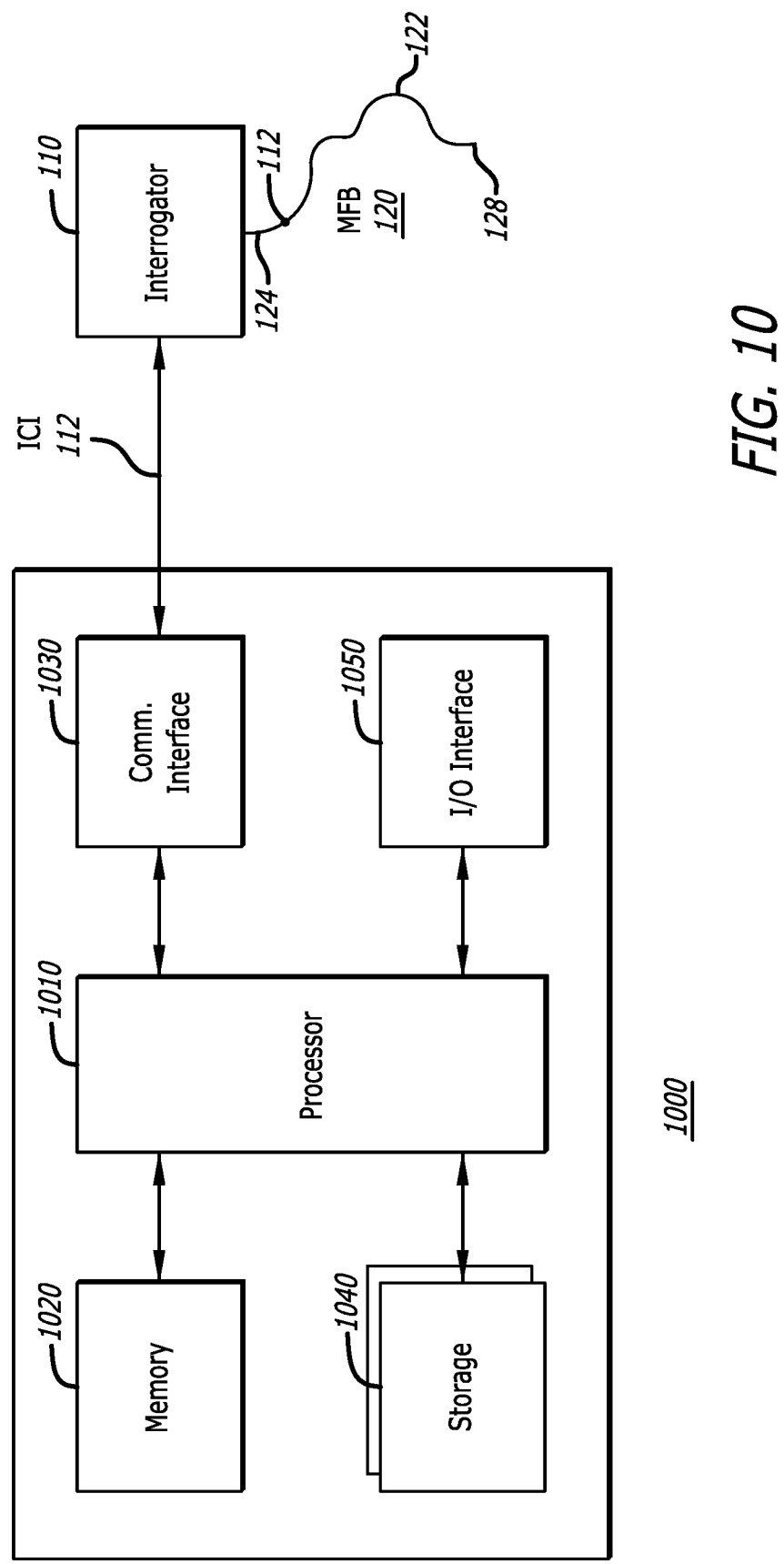
FIG. 10 is a block diagram of an exemplary computing device or environment.

FIG. 10 is a block diagram of a computing device 1000 or environment that may be used in conjunction with examples and embodiments disclosed herein. Device 1000 may be or be a part of interrogator 110 and/or of system 140. As shown in FIG. 10, the computing device 1000 includes a processor 1010, memory 1020, a communications interface 1030 coupled to interrogator which is connected to MFB 120, along with storage 1040, and an input/output interface 1050. MFB 120 operationally coupled to interrogator 110 via an integrated connection interface (ICI) 112 which may be or include comm interface 1030.

The processor 1010 may be or include one or more microprocessors, microcontrollers, digital signal processors, application specific integrated circuits (ASICs), or a systems-on-a-chip (SOCs). The memory 1020 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 1020 may store software programs and routines for execution by the processor, such as for dynamically transitioning of a simulating host of a portion or all of network interactive environments. These stored software programs may include an operating system software. The operating system may include functions to support the input/output interface 1050, such as protocol stacks, coding/decoding, compression/decompression, and encryption/decryption. The stored software programs may include an application or "app" to cause the computing device to perform portions of the processes and functions described herein, such as the process of dynamically transitioning of a simulating host of a portion or all of network interactive environments. The word "memory", as used herein, explicitly excludes propagating waveforms and transitory signals. The application can perform the functions described herein.

Connections of interface 1030 to and from interrogator 110 are shown. The communications interface 1030 may include one or more wired interfaces (e.g. a universal serial bus (USB), high definition multimedia interface (HDMI)), one or more connectors for storage devices such as hard disk drives, flash drives, or proprietary storage solutions. The communications interface 1030 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 1000.

The communications interface 1030 may include radio-frequency circuits, analog circuits, digital circuits, one or more antennas, and other hardware, firmware, and software necessary for communicating with external devices. The communications interface 1030 may include one or more specialized processors to perform functions such as coding/decoding, compression/decompression, and encryption/decryption as necessary for communicating with external devices using selected communications protocols. The communications interface 1030 may rely on the processor 1010 to perform some or all of these functions in whole or in part.

Storage 1040 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 1050, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, and telephones. These computing devices may run an operating system, including, for example, variations of the Linux, Microsoft Windows, and Apple Mac operating systems.

The techniques may be implemented with machine readable storage (e.g., non-transitory) media in a storage device included with or otherwise coupled or attached to a computing device 1000, such as, when executed, for performing dynamically transitioning of a simulating host of a portion or all of network interactive environments. That is, the software may be stored in electronic, machine readable media. These storage media include, for example, magnetic media such as hard disks, optical media such as compact disks (CD-ROM and CD-RW) and digital versatile disks (DVD and DVD±RW), flash memory cards and other storage media. As used herein, a storage device is a device that allows for reading and/or writing to a storage medium. Storage devices include hard disk drives, DVD drives, flash memory devices, and others.

Device 1000, interrogator 110 and/or system 140 may each be or include an apparatus having a non-transitory machine readable medium storing a program having instructions which when executed by a processor will cause the processor to perform the actions, function and/or processes described herein, such as to measure MFB twist distribution data along a multi-fiber shape sensor bundle using OFDR phase interrogation data.

The computing system environment is only one example of a suitable computing environment and is not intended to suggest any limitation as to the scope of use or functionality. As for replacing device 1000, numerous other general purpose or special purpose computing system environments or configurations may be used, including those implementing cloud and artificial intelligence (AI). Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Phase Tracking for Increased Angular Accuracy

Shape sensing with a multi-core fiber assumes that the distances between cores in the fiber remain constant, when viewed in cross section, regardless of the shape of the fiber. This assumption is often valid because glass is very hard and very elastic. Further, the cross section of the fiber (e.g., ~125 microns) is small when compared with the dimensions of curves experienced by the fiber (e.g., bend radii greater than 5 mm). This maintenance of the cross sectional position of the cores implies that all deformation of the fiber must be accommodated by the elongation or the compression of the cores.

Figure 11:
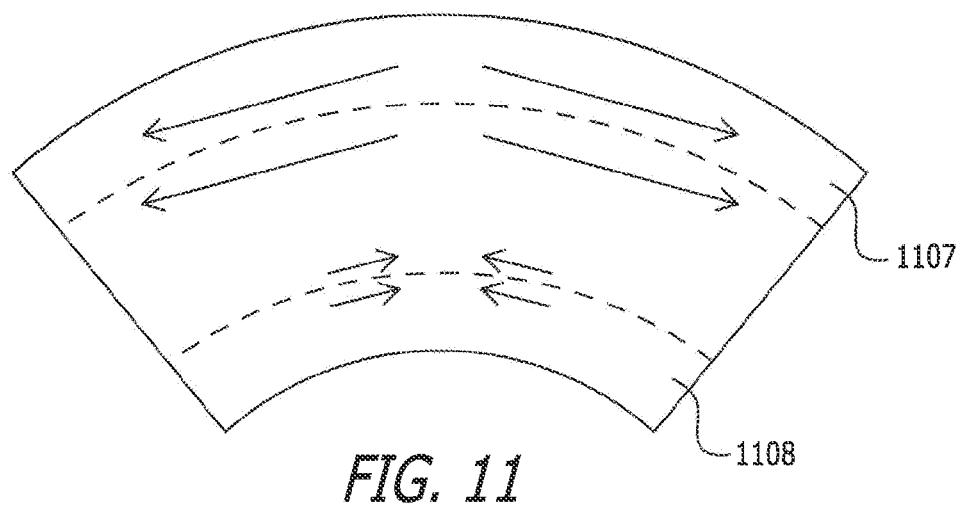
FIG. 11 shows a bent multi-core fiber.

As shown in FIG. 11, when an MFB is bent, a radially offset fiber on the outside 1107 of the bend will be elongated while a radially offset fiber on the inside 1108 of the bend will experience compression. Since the average length of a fiber segment is assumed to remain unchanged, an exercise in geometry shows that the change in the pointing direction, (i.e., a vector that describes the position of the central axis of the fiber segment), can be calculated based on the change in the fiber lengths and the distance between the fibers. Other effects, such as the strain-optic coefficient, must be taken into account. The result is that the change in pointing direction for a given segment of fiber is directly proportional to the difference in length changes in the fibers within that segment.

Figure 12:
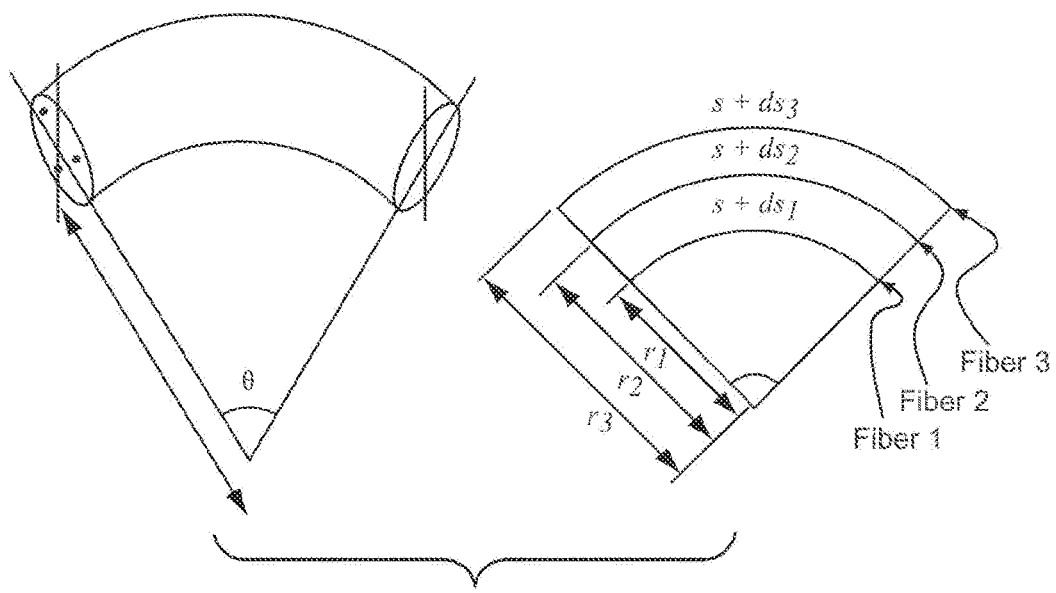
FIG. 12 shows that the bend in the fiber is proportional to the strain in the off-center cores.

FIG. 12 shows that the bend in the fiber θ is proportional to the strain c in the radially offset fibers, where s is the segment length, r is radius, and k is a constant. In order to eliminate tension and temperature from the measurement, a differential measurement between the offset fibers is used:

$$\Delta\theta = k\bigl((d_{s2} - d_{s1})/s\bigr) = k(\epsilon 2 - \epsilon 1) \quad \text{Eq. 1}$$

The above equation describes the angular change for a given fiber segment and how it relates to a change in strain. Moving to the next segment in the fiber, the angular change of the previous segment must be added to the next change in angle for the next segment to calculate the current pointing direction of the fiber. In two dimensions, all of the previous angles can be accumulated to find the bend angle at any particular location along the fiber.

Figure 13:
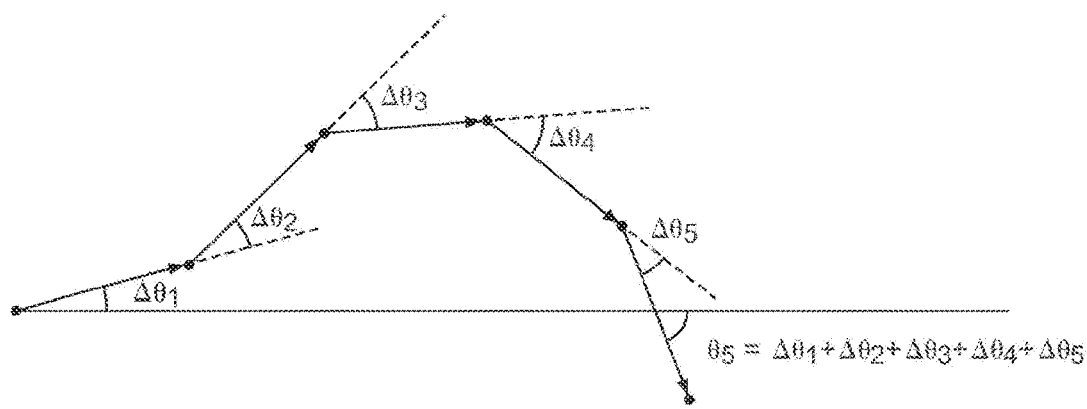
FIG. 13 shows that bend angle at any location along the fiber can be determined by a summation of all previous angles.

FIG. 13 shows the bend angle at any point or location along the fiber can be determined by a summation of all angles leading up to that point, e.g., $\theta_5 = \Delta\theta_1 + \Delta\theta_2 + \Delta\theta_3 + \Delta\theta_4 + \Delta\theta_5$. If there are errors in measuring the angles, these errors accumulate along the fiber and result in a total error. This error becomes greater the longer the fiber; growing as the square root of the number of segments.

To avoid this accumulated angle measurement error, it is possible to directly measure the change in length of a segment rather than measuring strain. Mathematically, the summation of angles then becomes the summation of the length changes along the fiber as shown in equation (2) where L corresponds to fiber length:

$$\theta = \Sigma\Delta\theta = k\Sigma(d_{s2} - d_{s1})/s = k(\Delta L_2 - \Delta L_1)/s \quad \text{Eq. 2}$$

Thus, the angle at any position z along the fiber then becomes linearly proportional to the difference between the total changes in length of the fibers up to that position as shown in equation (3).

$$\Theta(z) \alpha \Delta L_2(z) - \Delta L_1(z) \quad \text{Eq. 3}$$

Therefore, if the total length change along the fiber can be accurately tracked continuously, rather than summing each individual local change in strain, the angular error can be prevented from growing. Later, it will be shown how it is possible to track the change in length of a fiber to an accuracy better than 10 nm, and to maintain this accuracy over the entire length of the fiber. This level of accuracy yields 0.3 degrees of angular accuracy with a 70 micron separation between fibers and, theoretically, about 0.5% of fiber length position accuracy.

In some cases, the cumulative relationship defined in Eq. 3) does not hold in three dimensions. But most three dimensional shapes can be accurately represented as a succession of two dimensional curves, and in the presence of small angular changes (<10 degrees), three dimensional angles also have this simple cumulative relationship. As a consequence, this approach is useful to assess error contributions in three dimensions.

The insight provided by this geometric exercise is that the total length change or phase change as a function of distance along the MFB is used rather than local strain. In other words, relatively larger errors in the measured local strain values can be tolerated as long as the integral of the measured strain corresponding to the total length change up to that point, remains accurate. Nanostrain accuracies are achieved without requiring extremely large signal-to-noise ratios as the distances over which the nanostrains are calculated are relatively large (e.g., many centimeters such as 10-1000 cm). As explained later in description, the tracking of the change in length can also be used to assess rotation and/or twist along the length of the fiber allowing higher than expected accuracies to be achieved in the measurement of fiber roll, twist and/or rotational angle around the fiber's axis, as well.

Phase Tracking in Optical Fiber

As a sensor, optical fiber can provide spatially continuous measurements along its entire length. Continuous measurements are important because optical phase shifts are used to provide very high resolution displacement measurements. The intrinsic scatter in the fiber can be used to achieve this measurement, but it is conceptually easier to begin the explanation with FBGs. The vacuum wavelength of the light is about 1550 nm, and its wavelength in the fiber is about 1000 nm. The period of the grating is therefore about 500 nm. Typically, a Bragg grating is used as a sensor by measuring its reflected spectrum. The Bragg grating condition may be calculated using the equation below.

$$\lambda_B = 2n\lambda \quad \text{Eq. 4}$$

In this equation, $\lambda_B$ represents wavelength, n is the index of refraction of fiber, and Λ or λ corresponds to the period of the grating. If it is assumed that the index of refraction remains constant, then the reflected wavelength is solely dependent on the period of the grating. As the fiber is strained, the period of the grating is distorted, creating a shift in the reflected wavelength. Thus, for a shift in wavelength, it is possible to derive the amount of strain that was applied to the fiber. The period of a Bragg grating is highly uniform, and it is convenient to model this periodicity as a sinusoidal modulation. When represented as a sinusoid, distortions in the period of the grating can be described as phase shifts. To illustrate this concept, consider the example in FIG. 14 which shows that as a fiber containing Bragg gratings is strained, a phase difference measured from a reference state begins to accumulate.

Figure 14:
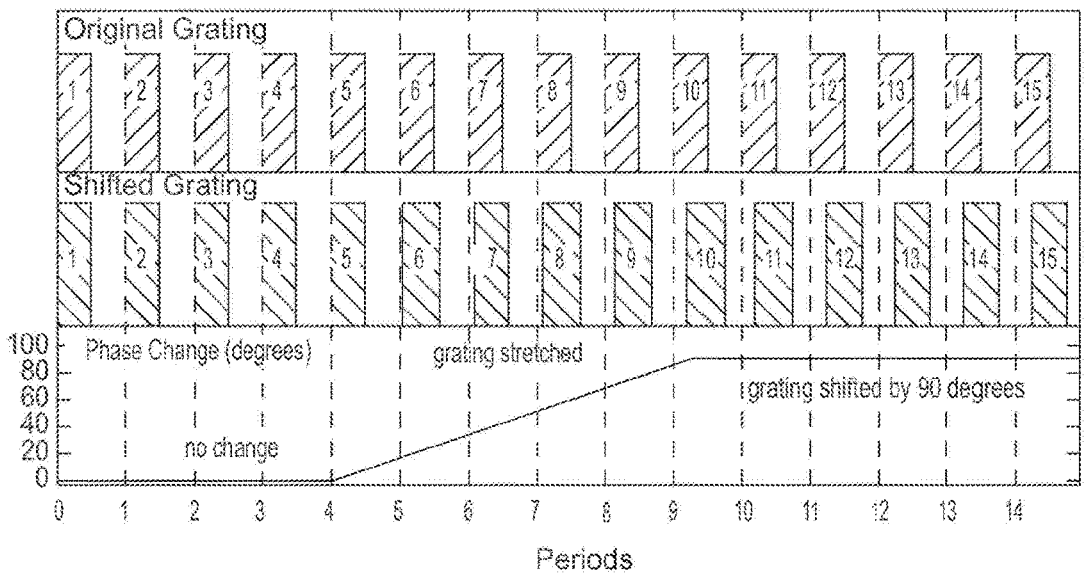
FIG. 14 shows that as a fiber containing Bragg gratings is strained, a phase difference measured from a reference state begins to accumulate.

The depiction of a strained Bragg grating shown in FIG. 14 illustrates the local changes in index of refraction as alternating white and hatched segments. Assuming an ideal Bragg grating, all of the periods are identical, and the phase of the modulation pattern increases linearly moving along the grating. In other words, the rate of change of the phase with distance is inversely proportional to the period of the grating. If a small portion of the grating is stretched, then the rate of change of the phase decreases in the stretched portion.

In FIG. 14, the top pattern depicts an undistorted grating with a perfectly linear phase as a function of position. The lower shifted pattern depicts a grating distorted due to strain. The bottom graph shows the difference in phase between the two gratings at each location. The distortion in the grating results in a phase shift in the reflected signal of the grating with respect to the original undistorted phase. A phase shift of 90 degrees is illustrated. After the strained segment, the rate of change returns to the unstrained state. However, the phase in this region is now offset from the original phase by an amount equal to the total phase change in the strained segment. This phase offset is directly proportional to the actual length change of the optical fiber.

This illustration shows only fifteen periods of the grating. Since a period is 500 nm, this amounts to 7.5 um in length. Stretching the fiber to induce a 90 degree phase shift displaced the remaining unstrained gratings by a quarter of a period, or 125 nm. A typical OFDR measurement may have a spatial resolution on the order of 50 microns. In other words, each OFDR data point, or index, is separated by 50 um. So, a distortion of 125 nm results in only a small fraction of an OFDR index shift in the actual position of the grating. While the 125 nm change in position is not detectable itself, the 90 degree phase shift is relatively easily measured with an OFDR system.

OFDR can therefore be used to measure distortions within Bragg gratings, and instead of only measuring the rate-of-change of the phase (i.e., wavelength), the absolute phase can be measured, and from the phase, distance changes at each segment along the fiber (e.g., radially offset fiber). This is important for accurate shape measurements in a situation where the phase in the grating is observed to have changed, while the position of the grating shows no readily discernable change. Conventional optical fiber measurement technologies treat the phase shift and the position as separate effects.

Figure 15:
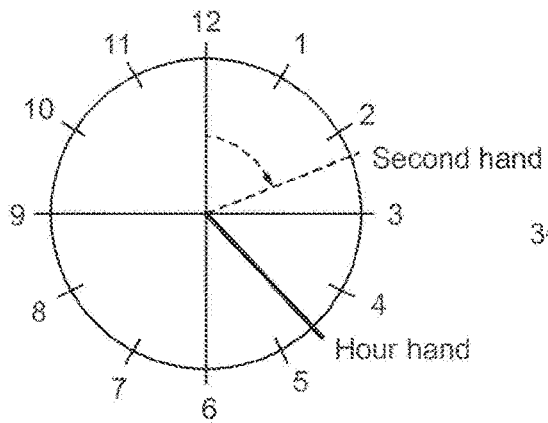
FIG. 15 shows a clock that helps to visualize the relationship between the phase shift and position.

One way to visualize the relationship between the phase shift and position is to imagine that the phase of the optical signal is represented by the second hand on a clock, and that the location along the fiber in index is represented by the hour hand on a clock. FIG. 15 illustrates a clock with no minute hand. Such a clock makes it difficult to determine the time to a resolution of one minute. But this clock is still useful for timing both short duration events with the second hand and long duration events with the hour hand. Lacking a minute hand, it is not useful for measuring intermediate midscale duration events (e.g., 1 hour 12 minutes and 32 seconds) to one second precision. This difficulty of linking the two scales has caused conventional optical measurement systems to treat the phenomena separately.

This clock analogy helps to clarify why a continuous measurement is needed along the entire length of the fiber. By monitoring the position of the second hand continuously, the number of complete revolutions can be measured, which allows the simultaneous monitoring of long durations to a high precision. Linking the clock analogy to the previous discussion of Bragg gratings, each 360 degrees, or $2\pi$, of phase change equates to a 500 nm shift in location. By continuously tracking phase along the optical fiber, both local strains and overall length changes of the optical fiber can be measured to a very high precision.

Figure 16:
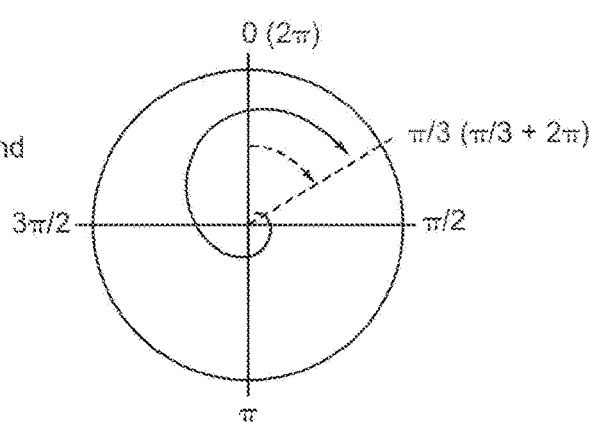
FIG. 16 illustrates how a lack of resolution in measuring phase can be problematic.

A challenge in tracking the phase continuously is that the resolution of the measurement must be sufficient such that the phase does not change from one segment to the next by more than $2\pi$. FIG. 16 illustrates how this lack of resolution can be problematic because there is no way to distinguish, for example, between a change of $\pi/3$ and a change of $\pi/3+2\pi$. So, two different phase shifts will appear to have the same value on the unit circle. In other words, an error of one index would be incurred in a count of full $2\pi$ revolutions. In this example, measurement of the overall change in length of the optical fiber would be deficient by 500 nm.

So, it may be important that a shape sensing system has sufficient resolution to guarantee the ability to track phase along the entire length of a shape sensing fiber to ensure the accuracy of a shape sensing system.

Rayleigh Scatter-Based Measurements

As explained above, the typical use of an FBG for sensing involves measuring shifts in the reflected spectrum of individual Bragg gratings spaced at some interval down a fiber. Strain is derived for each section of fiber from the measurement for each Bragg grating. For shape sensing using FBGs, each strain measurement indicates how much a given segment is bent and in which direction. This information is summed for all measured segments to give the total fiber position and/or shape. However, using this method, an error in each segment accumulates along the fiber. The longer the fiber, the larger the error in the measurement. This error using multiple Bragg gratings limits the speed of operation and the range of applications.

If there were a continuous grating along the fiber, then the phase could be tracked at every point along the fiber as described above. Tracking the phase along the entire length of the fiber avoids accumulating error. Instead of accumulating error as the square root of the number of fiber segments, the total length error remains constant at a fraction of the optical wavelength in the material. As mentioned earlier, a wavelength of light can be about 1550 nm in a vacuum and about 1000 nm in the fiber, which is effectively 500 nm in reflection. A signal-to-noise ratio of 50 provides for an accuracy of 10 nm due to the round trip (reflective) nature of the measurement. The resulting strain accuracy over one meter of fiber will be 10 nanostrain.

Rayleigh scatter can be viewed as a Bragg grating with random phases and amplitudes or a Bragg grating consisting entirely of defects. This Rayleigh scatter pattern, while random, is fixed within a fiber when that fiber is manufactured. Strain applied to an optical fiber causes shifts or distortions in the Rayleigh scatter pattern. These induced distortions of the Rayleigh scatter pattern can be used as a high resolution strain measurement for shape sensing by comparing a reference scan of the fiber when the fiber is in a known shape with a new scan of the fiber when it has been bent or strained.

Figure 17:
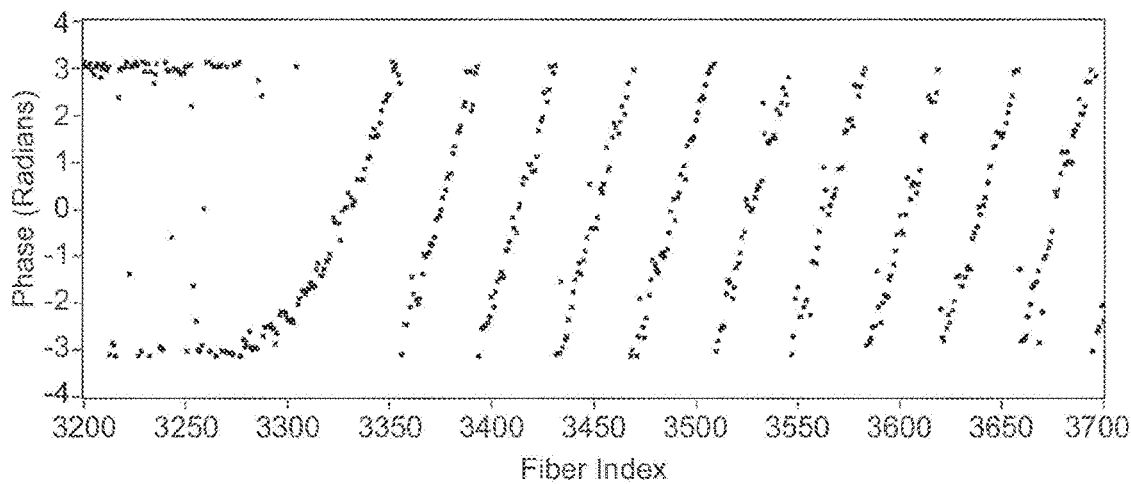
FIG. 17 is a graph that shows a phase difference of a Rayleigh scatter signal between a reference scan and a measurement scan at the beginning of a section of fiber that is under tension.

FIG. 17 shows example results of such a comparison. This figure shows the phase difference of the Rayleigh scatter signal between a reference scan and a measurement scan at the beginning of a section of fiber that enters a region that is under tension. The data is plotted as a function of fiber index, which represents distance along the fiber. Once the region of tension is entered, the phase difference begins to accumulate. Since and $-\pi$, have the same value on the unit circle, the signal experiences "wrapping" every multiple of $2\pi$ as the phase difference grows along the length of the fiber. This can be seen around index 3350 where the values to the left of this are approaching h, and then suddenly the values are at $-\pi$. As shown, each wrap represents about 500 nm of length change in the fiber. Since an index represents about 50 microns of length, it takes about one hundred wraps of the phase to accumulate a full index of delay change between measurement and reference.

Figure 18:
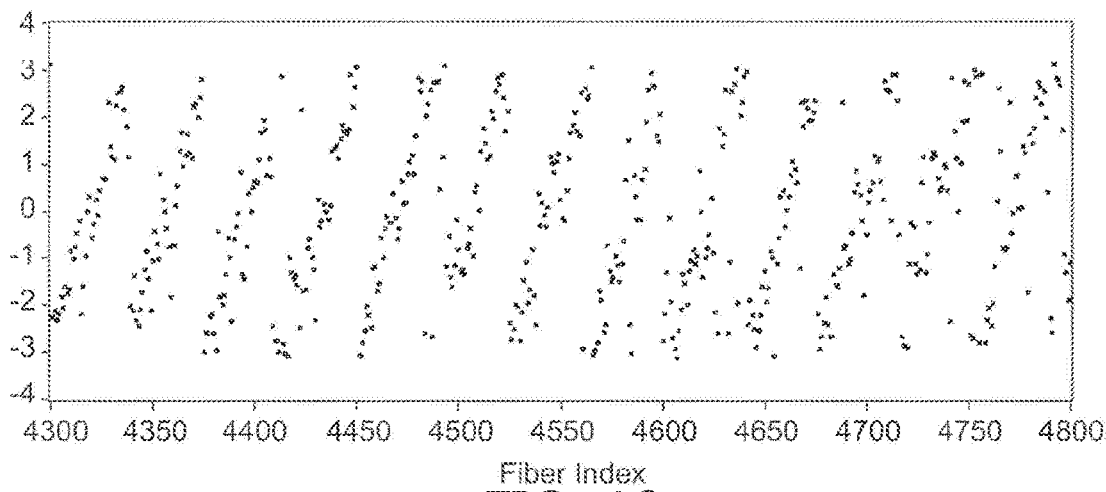
FIG. 18 is a graph that shows that coherence is lost with the reference measurement at a greater distance down a fiber under tension.

The data in FIG. 18 is from the same data set as that for FIG. 17, but from an area further down the fiber after about 35 wraps of the phase, or, roughly one third of an index. The noise on the phase difference data has increased and is caused by the increasing shift between the reference and measurement scatter patterns. This decreases the coherence between the reference and measurement data used to determine the phase difference. If the apparent location of an individual scattering fiber segment shifts by more than an index, then the coherence between the reference and the measurement is lost, and no strain measurement can be obtained from the comparison of scatter signals.

Therefore, the reference data should be matched to the measurement data by accounting for the shifting due to strain along the fiber. In the case of one index being about 50 microns, over a one meter segment, this amounts to only 50 parts per million, which is not a large strain. In fact, the weight of the fiber itself can induce strains on this order. Also, a change in temperature of only a few degrees Celsius can induce a similar shift. Therefore, this shift in index should be accounted for in the calculation of the distortion of the fiber.

A shift as a result of tension is a physical expansion of the individual fiber segments which results in an increased time of flight of the scattered light. The shift between reference and measurement is referred to as delay. The delay can be accounted for by looking at a model of how a shift in the delay to any point in the sensing fiber affects the signal reflected from this point. If a field (light) is oscillating at a frequency, ν, and it undergoes a delay of τ, then the optical phase as a function of delay is given by, $$\Phi = 2\pi\tau\nu \qquad \text{Eq. 5}$$

Figure 19:
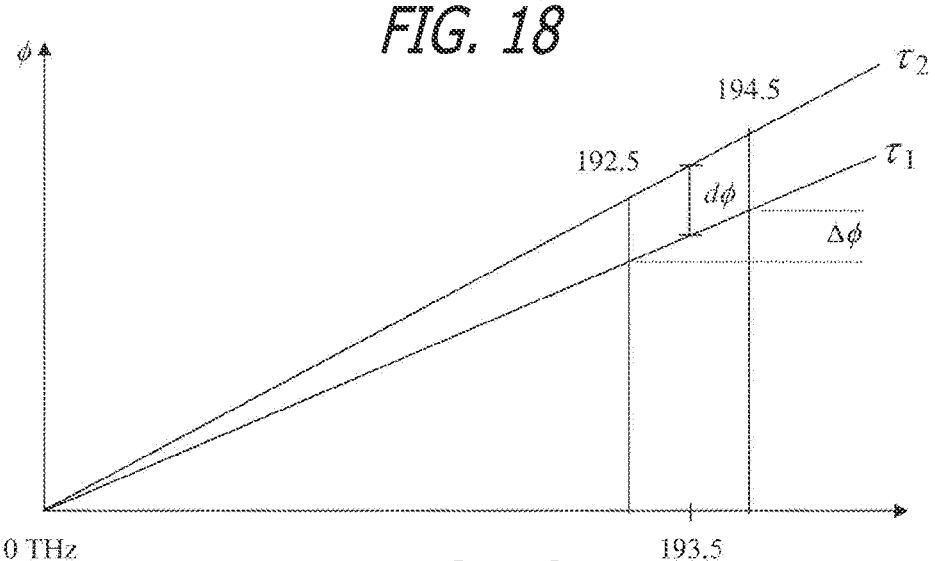
FIG. 19 shows optical phase plotted against frequency for two different delays.

If the optical phase, $\Phi$, is plotted as a function of frequency, ν, a straight line is obtained that intersects the origin. In practice, passing through a material such as glass distorts this curve from a perfect line, which should be kept in mind when comparing measured values to the values predicted by this model. But for immediate purposes, this model is sufficient. FIG. 19 shows this phase for two different delays. In an example, non-limiting measurement system using the principle described above, a typical sweep of the laser might cover a range of 192.5 to 194.5 THz.

These frequencies represent a sweep from 1542 nm (194.5 THz) to 1558 nm (192.5 THz), which has been a test sweep range for a non-limiting, test shape sensing application. Over this range of interest, the phase for a given delay sweeps over a range of $\Delta\Phi$. For the two delays shown, τ1 and τ2, the difference in this sweep range, $\Delta\Phi_2-\Delta\Phi_1$, is less than the change in phase at the center frequency, (193.5 THz), labeled d$\Phi$. The factor between the change in phase at the center frequency and the change in phase sweep range will be the ratio of the center frequency to the frequency sweep range. In this example case, the ratio is 96.7.

In the example test application, the sweep range, $\Delta\nu$, determines the spatial resolution, $\Delta\tau$, of the measurement. In other words, it determines the length of an index in the time domain. These are related by an inverse relationship:

$$\Delta\tau = 1/(\Delta\nu) \qquad \text{Eq. 6}$$

For the example frequency range described above, the length of an index is 0.5 ps, or 50 microns in glass. At the center frequency, a phase shift of $2\pi$ is induced by a change in delay of only 0.00516 ps, or 516 nm in glass. A phase shift of $2\pi$, then, represents only a fractional index shift in the time domain data. In order to shift the delay by one index in the time domain, the delay must change enough to induce a phase change at the center frequency of $96.7\times2\pi$.

These examples illustrate that a linear phase change represents a shift in the location of events in the time, or delay, domain. As seen above, a shift of one index will completely distort the measurements of phase change along the length of the fiber. To properly compare the phases, then, these shifts should be accounted for as they happen, and the reference data should be aligned with the measurement data down the entire length of the fiber. To correct for this degradation of coherence, a temporal shift of the reference data is required. This may be accomplished by multiplying the reference data for a given segment, $r_n$, by a linear phase. Here n represents the index in the time domain, or increasing distance along the fiber. The slope of this phase correction, γ, is found by performing a linear fit on the previous delay values. The phase offset in this correction term, φ, is selected such that the average value of this phase is zero.

$$r'_n = r_n e^{i(\gamma n+\varphi)} \qquad \text{Eq. 7}$$

Figure 20:
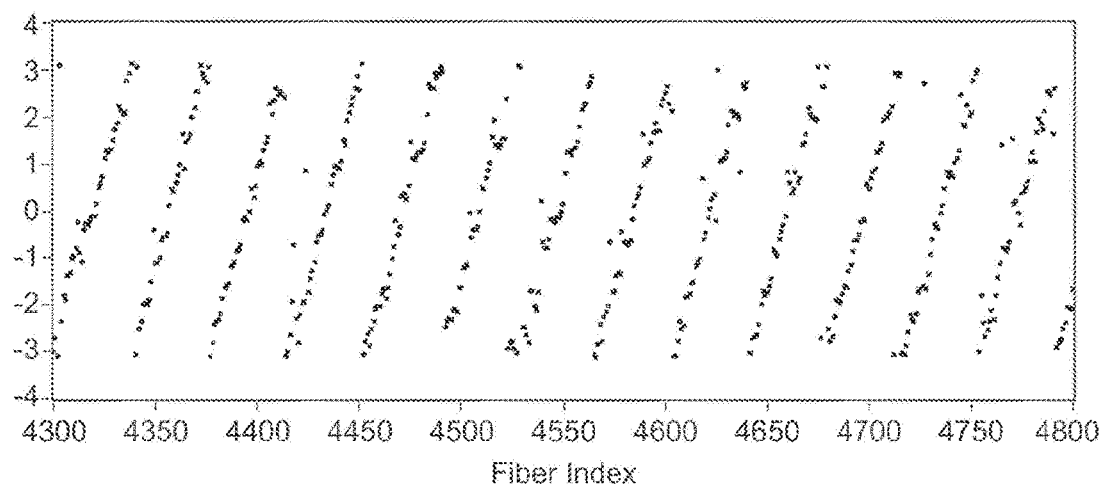
FIG. 20 shows a recovered phase over a section of fiber where a third of an index shift has occurred.

FIG. 20 shows the corrected phase difference over a section of fiber where a third of an index shift has occurred. The phase difference at this location maintains the same signal-to-noise ratio as the closer part of the fiber. By applying a temporal shift based on the delay at a particular distance, coherence can be recovered reducing phase noise.

Description of Processes

Figure 21:
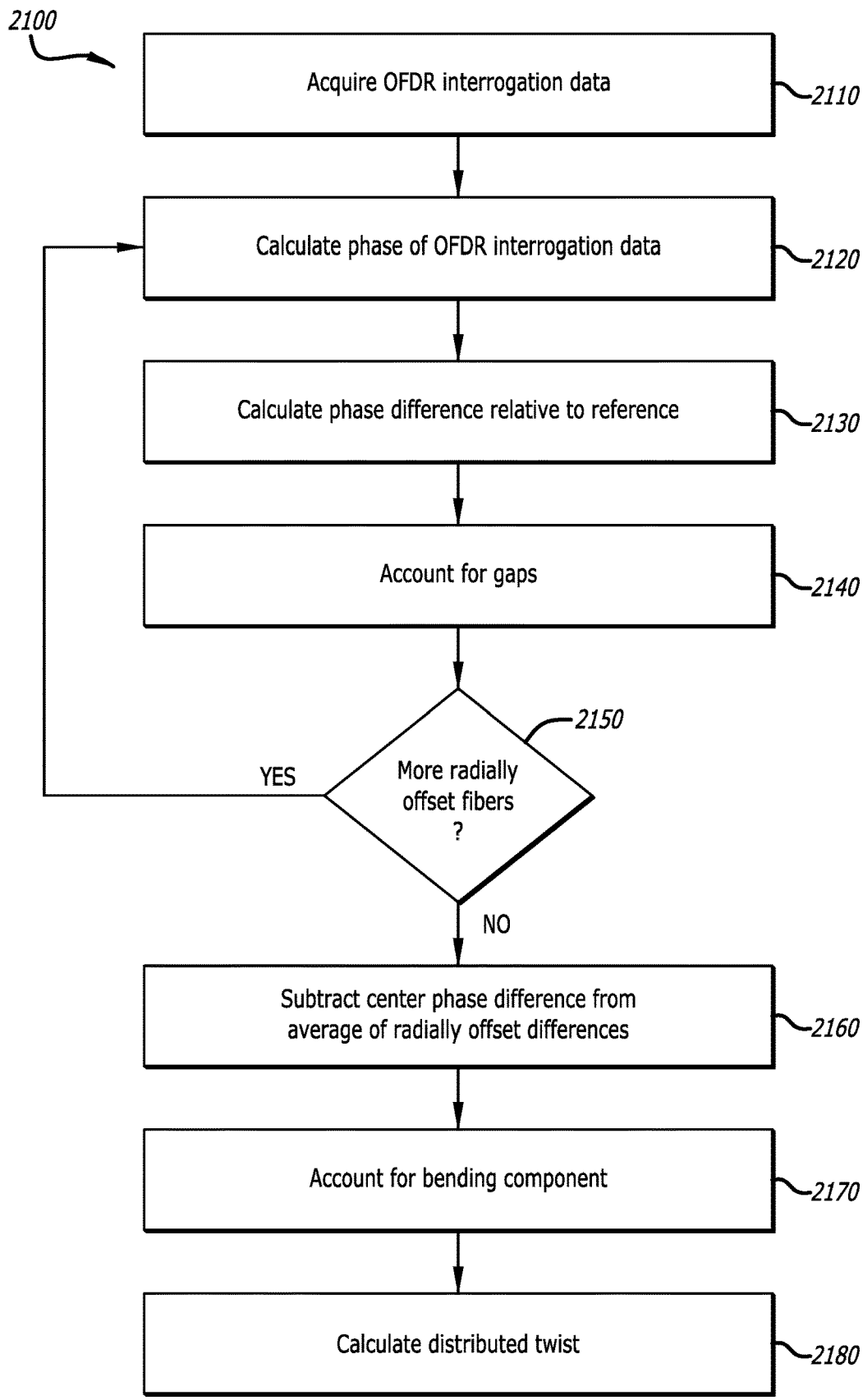
FIG. 21 is a flow chart of a process flow for calculating MFB twist distribution data along an MFB using optical frequency domain reflectometry phase interrogation data.

FIG. 21 is a flow chart of a process flow 2100 for calculating MFB twist distribution data along a multi-fiber shape sensor bundle using optical frequency domain reflectometry phase interrogation data. Flow 2100 may be performed by device 1000, interrogator 110 and/or system 140. The process flow 2100 starts at step 2110 and ends at step 2180, but the process may be cyclical in nature, such as by returning to step 2110 or 2120 after step 2180. Certain steps may not be shown in flow 2100. Flow 2100 may measure, determine or calculate the MFB twist distribution data along the length of FIG. 1's main section 122 for shape sensing, or along the length of section 122 and section 124. The MFB twist distribution data may be a distributed twist that is or includes the cross sectional rotation of the MFB sensor due to torsional deformation relative to an initial, untwisted state. This MFB twist distribution data may be a calculation along part of or along the entire length L or FIG. 1's main section 122 for shape sensing.

Process 2100 begins with step 2110 at which the OFDR interrogation data is acquired from an MFB. Step 2110 may be interrogator 110 and/or system 140 acquiring OFDR interferometric interrogation data for each of the fibers of MFB 120 or an MFB herein. The OFDR may use a variable frequency laser beam that is coupled to an optical interferometer. The output of a tunable laser source (TLS) is split between the reference and measurement arms of an interferometer which may be the fibers of the MFB. In the MFB fiber measurement path, the light is further split to interrogate a length of fiber under test (FUT) of MFB and return the scattered light. Since the laser is linearly tuned in the optical frequency, the interference between the measurement and reference field is recorded using optical detectors. The auxiliary interferometer used to trigger the data acquisition in equal optical frequency increments and a portion of the network where a gas cell is used to monitor the absolute wavelength of the tunable laser are not shown in the figure. The acquiring may include receiving light signals from the MFB and processing them to produce interrogation data.

OFDR systems can be classified in two main classes: coherent and incoherent OFDR. The OFDR herein may be either, or another applicable class. Most OFDR systems based on Rayleigh scattering are classified as coherent OFDR, while incoherent OFDR is mainly used for systems based on Raman or Brillouin scattering. The OFDR configuration can be used to detect temperature, phase, strain, beat length and high order mode coupling in optical fibers. It is an excellent choice for short sensing lengths (<100 m).

The MFB may have at least three single core radially offset fibers helically wrapped about and rigidly adhered to a central single core fiber, wherein the at least three radially offset fibers and the central single core fiber include fiber Bragg gratings (FBGs). Acquiring at step 2110 may be receiving OFDR interferometric interrogation data for all of the at least three radially offset fibers and the central fiber of the MFB. The MFB may be MFB 120, or any other MFB herein. The MFB may include six single core fibers helically wrapped about and rigidly adhered to a central single core fiber. The MFB is not a multicore optical fiber (MOF).

The radially offset fibers may each be offset by the same radial distance from the central fiber. They may have the same rotation period around the central fiber. Acquiring at step 2110 may include the following routine:
1. An ultra narrow, tunable, swept laser emits a temporally linear wavelength sweep;
2. This laser output frequency is used to generate an optical clock;
3. This laser output is split into multiple laser channels;
4. Each laser channel is emitted into various constitutive fibers within the MFB including the offset and central fibers;
5. Each fiber of the MFB reflects a portion of the laser channel light back toward the system;
6. MFB reflected signals of each fiber interfere with reference reflections that are generated per each laser fiber channel;
7. An interference signal is digitized by the system (e.g., device 100, interrogator 110 and/or device 140) to generate the OFDR interrogation data.

After step 2110, at step 2120 current phase signal data is calculated from the OFDR interferometric interrogation data. Calculating at 2120 may be extracting the current phase signal data for each of the at least three radially offset fibers and the central fiber of the MFB. Calculating at step 2120 (or steps 2120-2140) may include the following routine for each fiber of the MFB:
1. Calculate a Fast Fourier Transform (FFT) data of the OFDR interrogation data of step 2110;
2. Calculate a phase angle of the FFT data;
3. Calculate the phase angle difference relative to an initial reference state;
4. Unwrap the phase angle difference data;
5. Account for FBG gaps/correct FBG gap unwrapping discontinuities in the phase data.

In some cases, after 2110 the interrogation data, or after 2120 the current phase signal data does not include intensity, polarization, wavelength, or transit time of light in each of the optical fibers.

Figure 23:
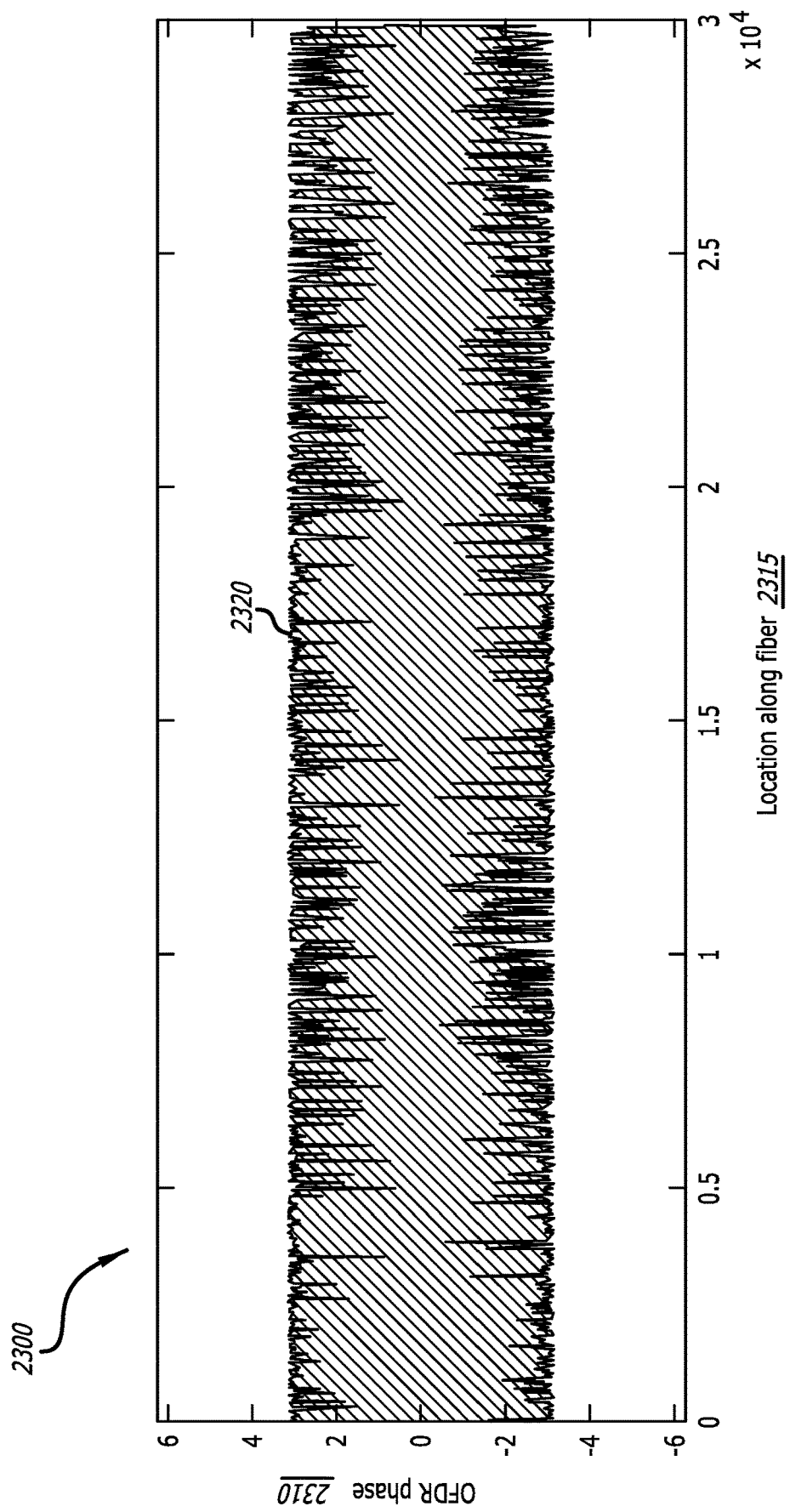
FIG. 23 is a plot showing current phase signal data of OFDR interrogation data along locations or length of a fiber of the MFB.

FIG. 23 is plot 2300 showing current phase signal data 2320 of OFDR interrogation data along locations or length of a fiber of the MFB. Phase data 2320 may be the phase data of OFDR interrogation data at step 2120 for an offset fiber or for a central fiber. Plot 2300 has vertical axis 2310 showing OFDR interrogation phase data (radians) (or phase variations from laser wavelength) along horizontal axis 2315 showing length along the fiber (sensor index) (such as in micrometers or microns) of length of an MFB fiber from the fibers proximal end or base, such as the beginning of where the MFB twist distribution data is being calculated from. This current phase signal data 2320 is for a single up or down sweep of the laser of a fiber, such as up or down sweep in frequency range and excluding turn points in frequency. Data 2320 is shown swinging up and down in phase from plus 3 radians to minus 3 radians.

After step 2120, at step 2130 a phase difference of the current phase signal data is calculated relative to previously acquired reference phase signal data for the MFB. The previously acquired reference phase signal data at step 2130 may be the prior phase of the fiber that the phase difference is being calculated for.

Step 2130 may be calculating phase difference data that is a change in phase data between the current phase signal data and previously acquired reference phase signal data from the OFDR interferometric interrogation data, for each of the at least three radially offset fibers and the central fiber of the MFB. The step 2130 phase difference calculation may be just a subtraction calculation of subtracting the previously acquired reference phase signal data from the current phase signal data.

Figure 24:
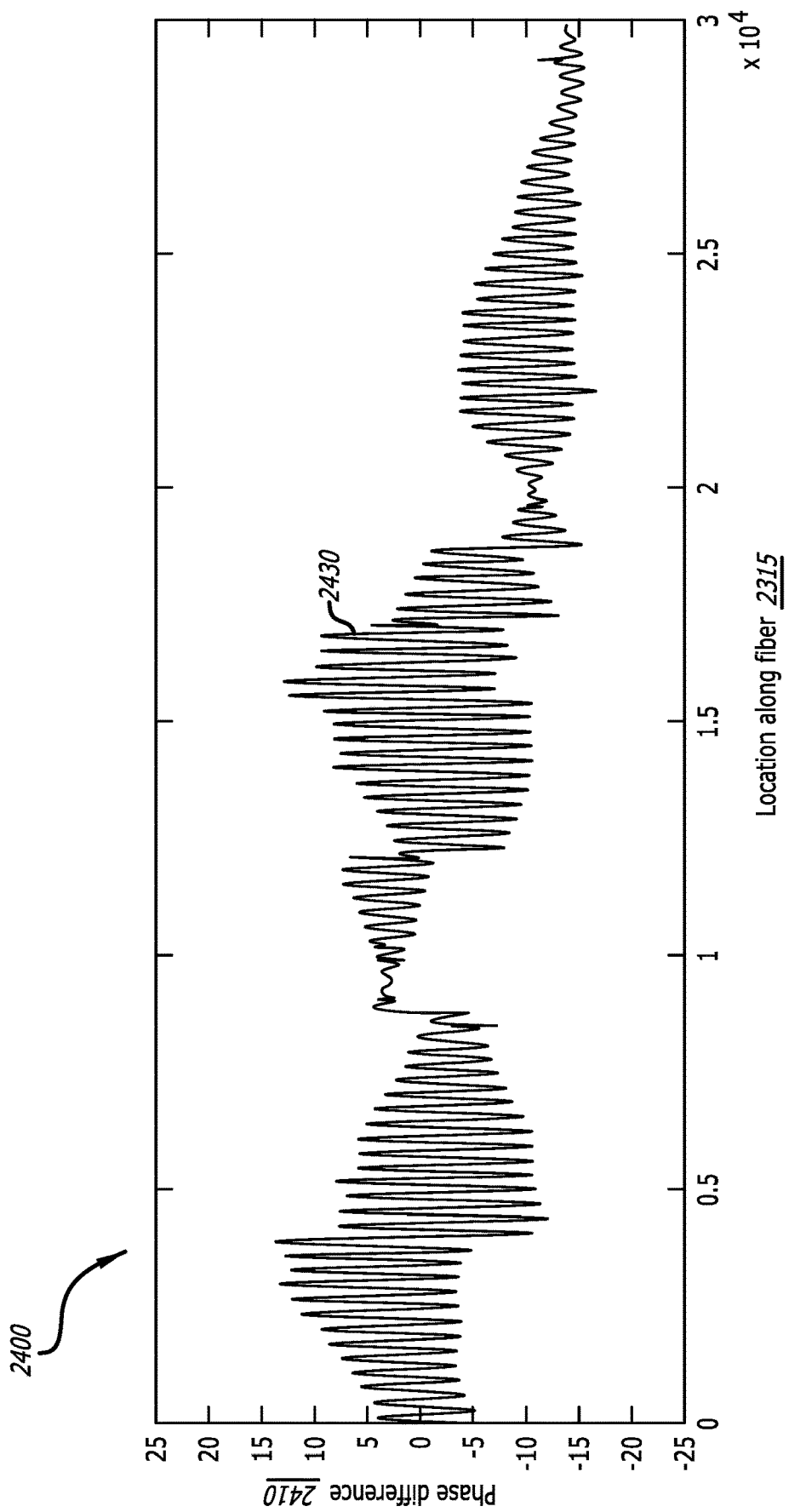
FIG. 24 is a plot showing change in phase or phase difference of OFDR interrogation data along locations or length of a fiber of the MFB.

FIG. 24 is plot 2400 showing change in phase or phase difference 2430 of OFDR interrogation data along locations or length of a fiber of the MFB. Phase difference data 2430 may be the phase difference data of OFDR interrogation data at step 2130 for an offset fiber or for a central fiber. Plot 2400 has vertical axis 2410 showing OFDR phase difference (radians) (or changes in the phase difference from laser wavelength of plot 2300 or phase difference radians) measurement of phase difference of OFDR interrogation data along horizontal axis 2315 showing length along the fiber (sensor index) (such as length of an MFB fiber from the fibers proximal end or base of main section 122). Data 2430 is shown swinging from plus 15 radians to minus 15 radians; and jumping differences of about 5 or 10 radians along the locations, such as due to FBG gaps in the fibers.

After step 2130, at step 2140 gaps are accounted for in the FBGs. For each of the phase differences of step 2130, step 2140 may include accounting for FBG gap-induced unwrapping discontinuities in the phase difference for each of the at least three radially offset fibers and the central fiber of an MFB. The results of step 2140 may be the creating of gap-mitigated phase differences of step 2130 of each for each of the at least three radially offset fibers and the central fiber. Accounting for FBG gap-induced unwrapping discontinuities at step 2140 may include the following routine for each fiber of the MFB:

1. Provide a calibration which describes the location of each gap (e.g., along a length of the fiber), per interrogated fiber within the MFB;
2. For each fiber, and for each gap, determine if there is a phase unwrapping discontinuity;
3. If a discontinuity is present for that fiber, determine the discontinuity magnitude for that discontinuity;
4. Remove that discontinuity, and progress to checking the next gap for that fiber;
5. Interpolate across each gap in order to further optimize continuity.

Step 2140 may include, such as prior to accounting for FBG gap-induced unwrapping discontinuities, unwrapping the change in phase or phase difference for each of the at least three helically wrapped fibers of an MFB. This may include calculating what the phase difference of each of the helically offset fibers would be if they were not helically wrapped around the central fiber, such as that any phase difference for temperature, strain, twist, bend, pressure, and other parameters does not include phase differences for being helically wrapped around the central fiber. Unwrapping at step 2140 may be an unwrapping phase processing calculation where the FBG gap-induced unwrapping discontinuities are accounted for to avoid the FBG gaps causing unwrapping discontinuities, which results in twist error. Thus, unwrapping at step 214 may assess each FBG gap to determine if an unwrapping discontinuity exists, and if it does, to correct for each FBG gap.

Step 2140 may include performing an initial unwrapping prior to accounting, and then performing additional unwrapping corrections to account for the FBG gaps and the unwrapping issues that the FBG gaps may cause.

Figure 25:
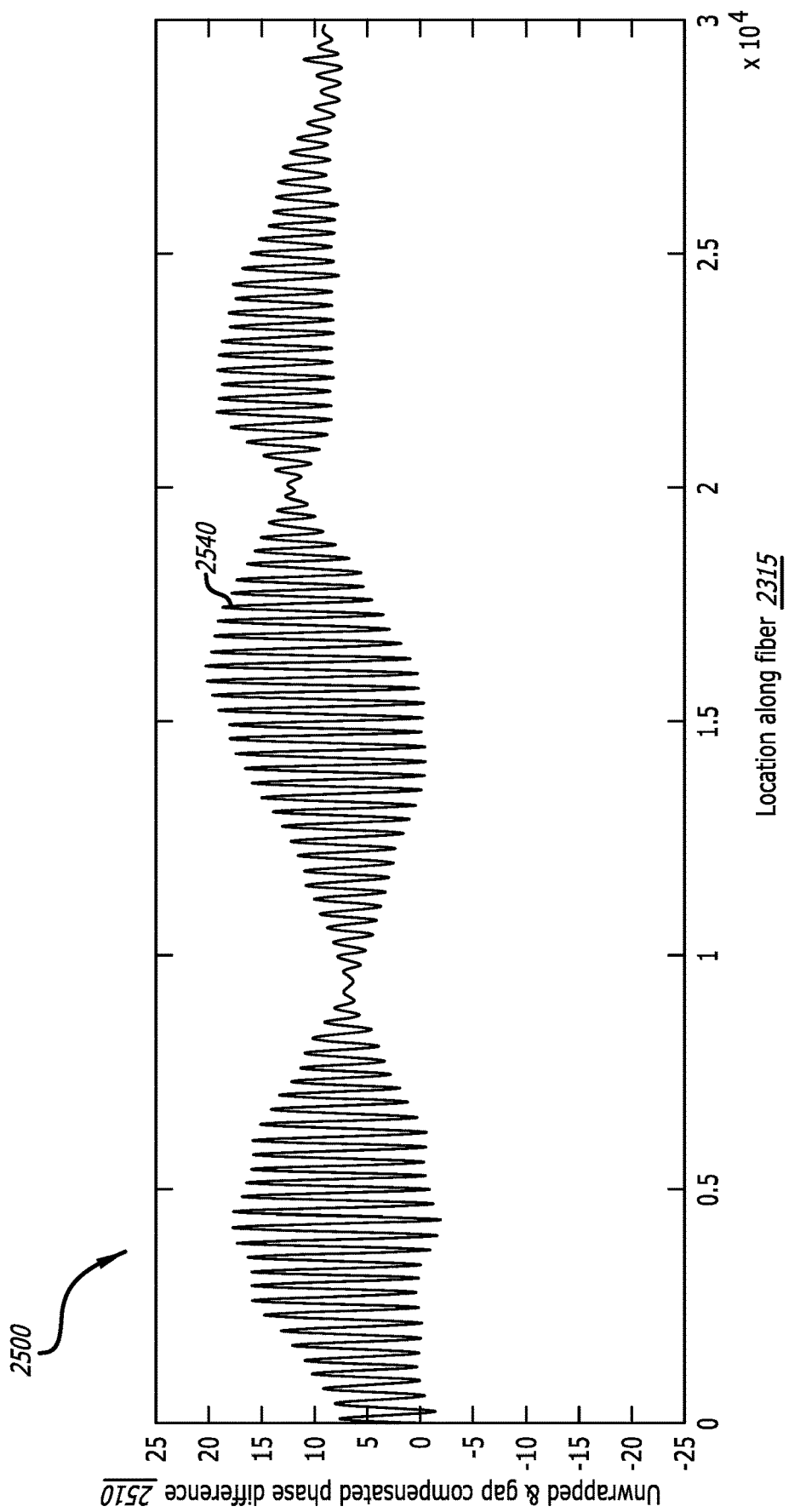
FIG. 25 is a plot showing unwrapped and gap-mitigated phase difference data along locations or length of a fiber of the MFB.

FIG. 25 is plot 2500 showing unwrapped and gap-mitigated phase difference data 2540 along locations or length of a fiber of the MFB. Difference data 2540 may be the gap-mitigated phase differences data at step 2140 for an offset fiber or for a central fiber. Plot 2500 has vertical axis 2510 showing OFDR phase difference (radians) along horizontal axis 2315 showing length along the fiber (sensor index). Data 2540 is shown swinging from plus 20 radians to minus 5 radians; without any jumps in difference of radians along the locations.

After step 2140, at step 2150 it is determined whether there are more radially offset fibers of the MFB for which to repeat steps 2120-2140. If the answer at 2150 is "yes" (e.g., there are more offset fibers), process 2100 continues to step 2120 from step 2150, and steps 2120-2140 are repeated. Step 2150 may repeat steps 2120-2140 for each of the remaining at least three radially offset fibers (and optionally the center fiber) of the multi-fiber bundle to determine gap-mitigated phase differences for each of the at least three offset fibers of an MFB. It may repeat 2-5 times to get the other offset fibers after the first one. It may repeat more times as needed for the MFB.

Steps 2110-2150 may include monitoring over time the resulting changes in the intensity, phase, polarization, wavelength, and/or transit time of light within the fibers of an MFB herein. In some cases, steps 2110-2150 are only monitoring phase data. In some cases, steps 2110-2150 are monitoring resulting changes in phase, but not monitoring the resulting changes in the intensity, polarization, wavelength, and/or transit time of light within the fibers of an MFB herein. In some cases, steps 2110-2150 are monitoring resulting changes in strain and/or bend in addition to phase using the interrogation data.

If the answer at 2150 is "no" (e.g., steps 2120-2140 have been performed for all of the offset fibers), process 2100 continues to step 2160 from step 2150. At this "no" point, the unwrapped and gap-mitigated phase difference data 2540 along locations or length of a fiber of the MFB may be created or exist for all of the offset fibers and the central fiber.

Figure 26:
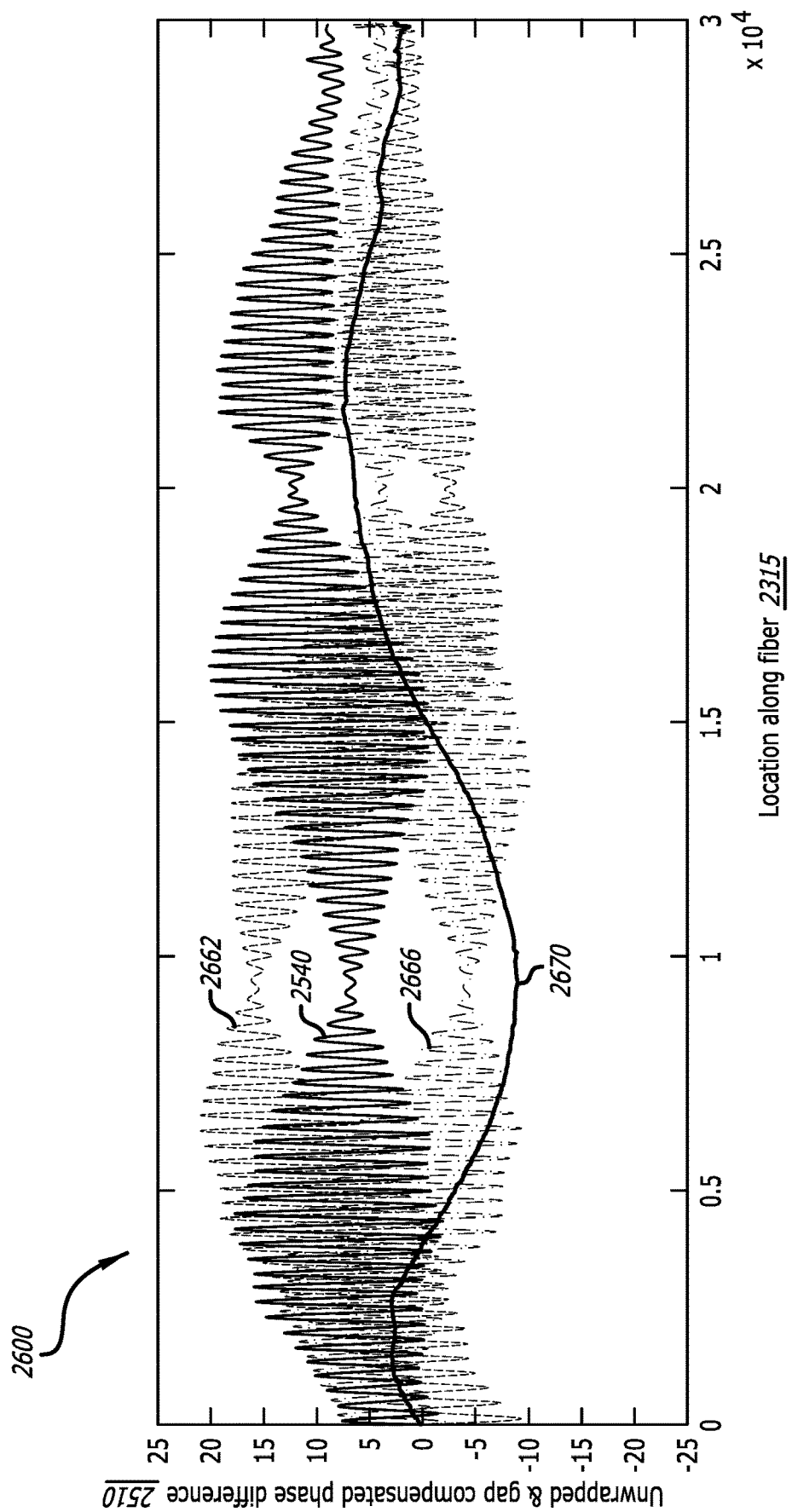
FIG. 26 is a plot showing unwrapped and gap-mitigated phase difference data of each of the at least three offset fibers and the central fiber along locations or length of a fiber of the MFB.

FIG. 26 is plot 2600 showing unwrapped and gap-mitigated phase difference data 2662, 2540 and 2666, one for each of the at least three offset fibers, and the gap-mitigated phase difference data 2670 for the center fiber, along locations or length of a fiber of the MFB. Difference data 2662, 2540 and 2666 may be the FBG gap-mitigated phase differences data at step 2150 for all three offset fibers while average 2670 may be the FBG gap-mitigated phase difference data at step 2150 for the center fiber as described for step 2150. Average 2670 may be a single curve as shown (e.g., not a sine waveform or waveforms having a frequency near those shown in the figure for the offset fibers), such as due to not including twist data and being the baseline to compare the offset fiber twist to. Plot 2600 has vertical axis 2510 showing OFDR phase difference (radians) along horizontal axis 2315 showing length along the fiber (sensor index). Plot 2670 is the result of step 2150 for the center fiber. The gap-mitigated phase difference data 2662, 2540 and 2666 are the result of 2150 for the at least three radially offset fibers. Data 2662, 2540, 2666 and 2670 are each shown swinging about 40 phase difference radians along the locations.

After step 2150, at step 2160 the center fiber phase difference is subtracted from an average of the radially offset phase differences of the at least three offset fibers of an MFB from step 2150. Step 2160 may include averaging the gap-mitigated phase differences from step 2150 of each of the offset fibers and then averaging those 3 averages of each offset fibers (not shown) over the location, then subtracting the gap-mitigated center fiber phase difference 2670 from the average of the average of the radially offset phase differences 2662, 2540 and 2666 of the at least three offset fibers to yield a twist-phase difference 2760 that is indicative of a distributed twist of the multi-fiber bundle. In other cases, step 2160 may include averaging the gap-mitigated phase differences from step 2150 of each of the offset fibers together (not shown), then subtracting the gap-mitigated center fiber phase difference 2670 from the each average to yield a twist-phase difference. At step 2160, the average gap-mitigated phase difference of the center fiber 2670 may be subtracted from the average gap-mitigated phase difference calculated for each offset fibers creates 3 different average difference curves of which curve 2760 is one of for one of the offset fibers. In other cases, the average gap-mitigated phase difference waveform of the center fiber 2670 is subtracted from the average gap-mitigated waveform of the combined three offset fiber gap-mitigated phase difference waveforms of data 2662, 2540 and 2666 to create curve 2760 to yield a twist-phase difference that is indicative of a distributed twist of the multi-fiber bundle.

Step 2160 may include subtracting the center fiber gap-mitigated phase difference data 2670 from the average of all of the three radially offset fibers' gap-mitigated phase difference data. Here, step 2160 may include the following routine for each fiber of the MFB:

1. Average each of the three radially offset fibers' gap-mitigated phase difference data;
2. Subtract the center fiber gap-mitigated phase difference data from the average of the three radially offset fibers' gap-mitigated phase difference data.

Figure 27:
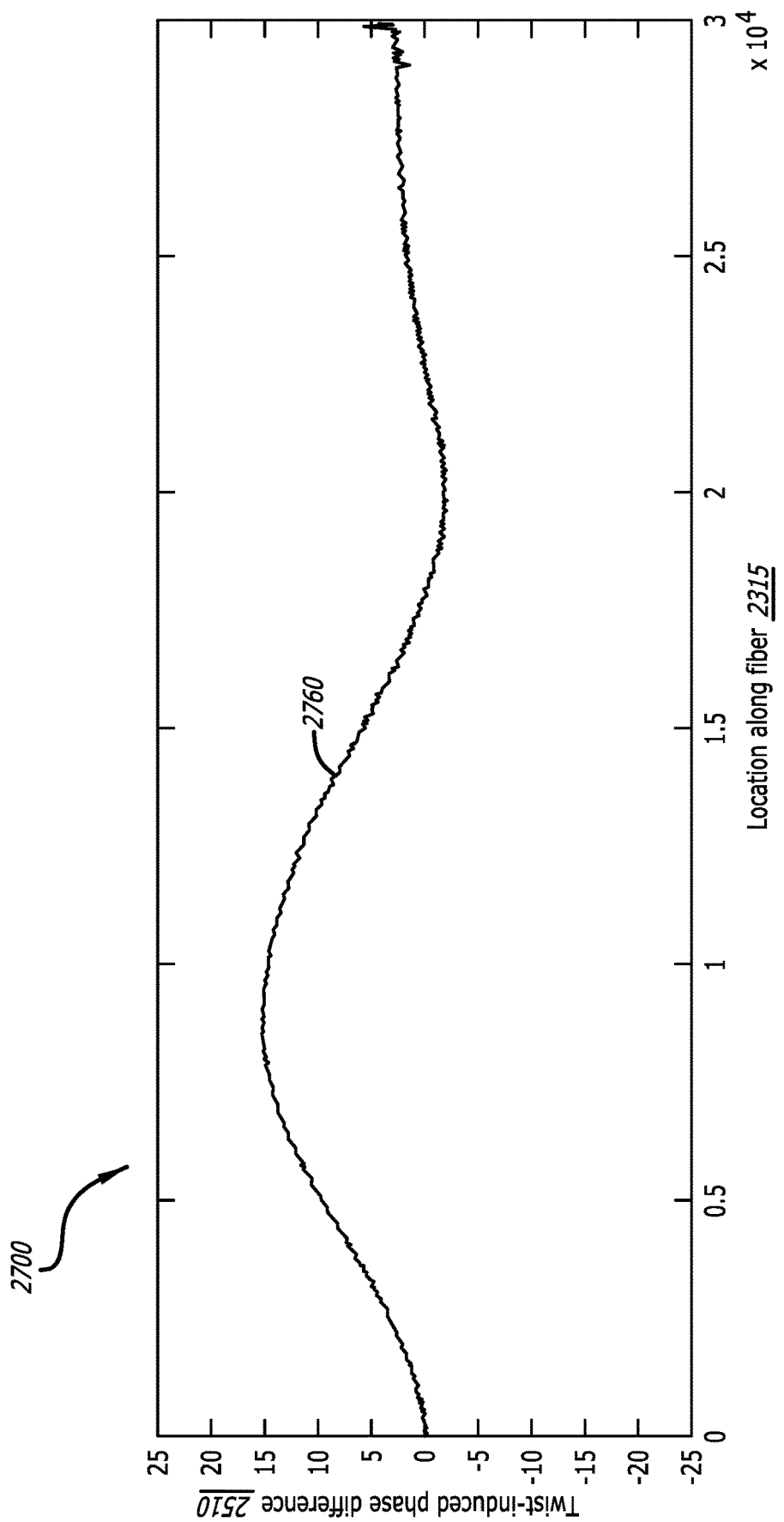
FIG. 27 is a plot showing a subtraction the center fiber gap-mitigated phase difference from an average of the change of the gap-mitigated phase differences of all of the offset fibers to yield a twist-phase difference.

FIG. 27 is plot 2700 showing a subtraction of the gap-mitigated center fiber phase difference 2670 from an average of the change of the gap-mitigated phase differences of all of the offset fibers to yield a twist-phase difference 2760 that is indicative of a distributed twist of the multi-fiber bundle. In other cases, plot 2700 shows subtracting the average of the gap-mitigated center fiber phase difference 2670 from an average of the change of the gap-mitigated phase differences of one or of all of the offset fiber phase difference waveforms of data 2662, 2540 and 2666 to yield a twist-phase difference 2760. Plot 2700 may show the result of step 2160 of subtracting the gap-mitigated center fiber data from the average of the three radial fibers gap-mitigated fiber data of step 2140 such that data 2760 is the result of this calculation for the MFB. Plot 2700 has vertical axis 2510 along horizontal axis 2315. Plot 2760 may be a difference of the average change of one of the 3 gap-mitigated phase difference of an offset fibers minus an average change of the central fiber. Plot 2760 may be an average of the radially offset gap-mitigated phase differences of the at least three offset fibers after subtracting data 2670. Data 2670 may be the result of subtracting the center fiber gap-mitigated phase differences data from the average of the gap-mitigated phase differences of the three radial fibers. Data 2760 shows a swing from zero phase difference to about plus 15 phase difference to about minus 2 phase difference and back to zero in radians along the locations.

After step 2160, at step 2170 the bending components are accounted for. Step 2170 may include removing a bending-induced component twist phase difference 2760 of step 2160 to create bend-compensated twist phase difference distribution. Step 2170 may be removing the bending-induced component for each of the at least three radially offset fibers of an MFB from the twist-phase difference 2760 of step 2160 to create a bend-compensated twist phase difference distribution from the OFDR interferometric interrogation data, from the twist-fiber phase difference 2760 of step 2160, and/or from the phase differences from step 2150 of each of the offset fibers. Step 2170 may be removing the bending-induced component for all of the at least three radially offset fibers of an MFB from the twist-phase difference 2760 of step 2160 to create a bend-compensated twist phase difference distribution. In some cases, it includes removing the bending-induced component for the central fiber. The bending induced component twist phase differences may be calculated from the phase and/or strain measurements in the interrogation data of step 2110. At step 2170 bending induced component twist phase difference may be removed from the data shown by 2760, as shown in bending compensated data 2875. A second example for removing bending induced component twist phase difference at step 2170 is shown by removing bending induced difference from data 2870 to create bending compensated data 2875.

Accounting for the bending components at step 2170 may include the following routine for each fiber or a sum of all fibers of the MFB:

1. Provide a previous calibration of bending response;
2. Determine curvature and bending direction per normal procedure;
3. Utilize curvature, bending direction, and calibration to determine the bending-induced response;
4. Subtract bending-induced response to yield the isolated response due to twist.

Figure 28:
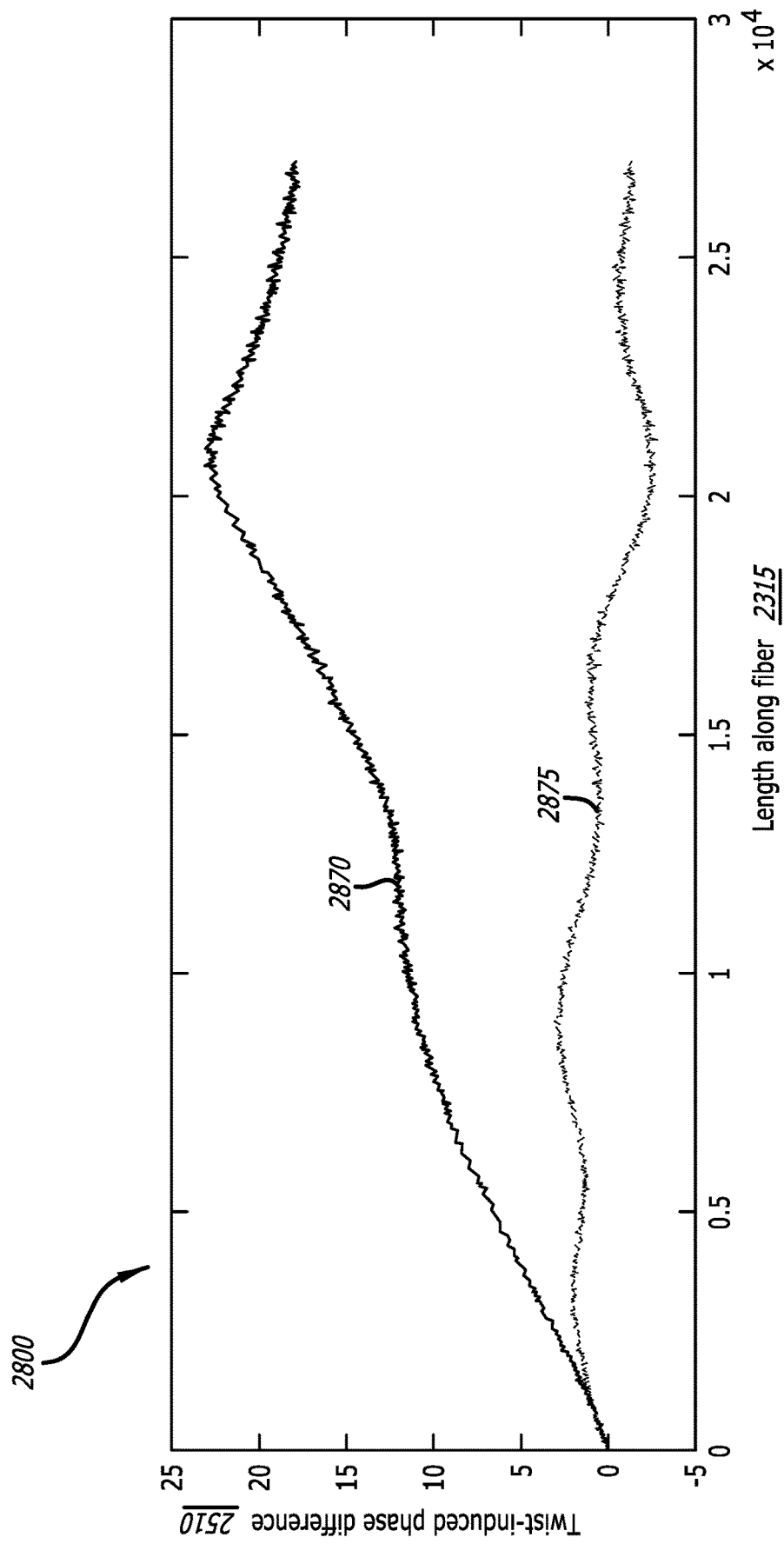
FIG. 28 is a plot showing a bend-compensated twist phase difference distribution data.

FIG. 28 is plot 2800 showing a bend-compensated twist phase difference distribution data 2875. Data 2875 may be bend compensated (e.g., a bend-compensated twist phase difference distribution) from raw twist-fiber phase difference 2870 or 2760. Data 2875 may be a bend-compensated version of the result of subtracting the center fiber gap-mitigated phase difference data 2670 from the average of the radially offset fibers' gap-mitigated phase differences of one of data 2662, 2540 or 2666. Data 2875 may be a bend-compensated version of the result of subtracting the center fiber gap-mitigated phase difference data 2670 from the average of the radially offset fibers' gap-mitigated phase differences of the aggregate of data 2662, 2540 and 2666. The gap-mitigated phase difference data of all radial offset fibers and the center fiber may be used to average the radial results of the offset fibers and subtract the center fiber result from that average. The bending-induced component twist phase difference at step 2160 may then be removed at step 2170 to create bend-compensated twist phase difference distribution. This final result may be called "twist-phase". Using the language of previous steps, data 2875 may be the average radial fiber gap-mitigated phase difference minus the center fiber gap-mitigated phase difference, and plot 2800 shows both the pre-bend mitigate version data 2870 and post-bend-mitigated version data 2875 in units of radians. Distribution data 2875 may be the bend-compensated twist-phase difference distribution data at step 2170 for one of the three offset fibers. Plot 2800 has vertical axis 2510 along horizontal axis 2315. Data 2875 may be the data of step 2170 for one of the offset fibers where plot 2875 is bend-compensated twist-phase difference distribution data of all of the 3 raw twist-phase differences 2760. Data 2870 shows a swing in phase difference from zero to about plus 22 and back to about 18 in radians along the locations 2315. Data 2875 shows a bend-compensated twist phase difference distribution data 2875 swing from zero to about plus 2 and back to about minus 3 along the locations 2315.

After step 2170, at step 2180 MFB twist distribution data 2990 (e.g., twist distributed data for the MFB) is calculated in three dimensions (3D) along the MFB from the bend-compensated twist phase difference distribution data of step 2170. The MFB twist distribution data 2990 may be calculated in three dimensions (3D) along length L of the MFB, such as along part or all of length L of the MFB.

Calculating at step 2180 may be or include converting units of the OFDR interferometric interrogation data to units of MFB twist distribution data 2990. In some cases, step 2180 includes calculating MFB twist distribution data 2990 along the length L of the MFB using the bend-compensated twist phase difference distribution data 2875 of step 2170. In some cases, step 2180 includes converting the bend-compensated twist phase difference distribution data 2875 from the OFDR interferometric interrogation data units to 3D twist units to calculate MFB twist distribution data for the at least three radially offset fibers (and optionally for the central fiber), or for the entire MFB.

In some cases, step 2180 includes inputting the bend-compensated twist phase difference distribution data for an average of all of the at least three radially offset fibers (and optionally for the central fiber) of an MFB into a 3D algorithm to calculate shape and/or the MFB twist distribution data 2990 along the length of the MFB. In some cases, step 2180 includes inputting the MFB twist distribution data for each of the at least three radially offset fibers (and optionally for the central fiber) of an MFB into a 3D algorithm to calculate shape and/or the MFB twist distribution data 2990 along the length of the MFB. In some cases, calculating at step 2180 or process 2100 does not include calculating using interrogation data for, of or having intensity, polarization, wavelength, or transit time of light within the optical fibers. Calculating at step 2180 or process 2100 may be calculating shape of the MFB by calculating the position and orientation of every point along the MFB, which requires the calculation of twist first. Calculating at step 2180 may be a single step that can be described as multiplying the bend-compensated twist-phase difference data 2875 by a scaling factor.

The MFB twist distribution data along an MFB may be or include a 3D location from the base or proximal end of the MFB main section 122 or section 124 to a twist location at the distal end or terminal portion 126 of the MFB.

In some cases, process 2100 includes obtaining the gap-mitigated phase difference data of all radial offset fibers and the center fiber; then averaging the radial results, and subtracting the center fiber result. Then the bending component is removed to calculate a final result "twist-phase" distribution data along part or all of length L of the MFB.

Figure 29:
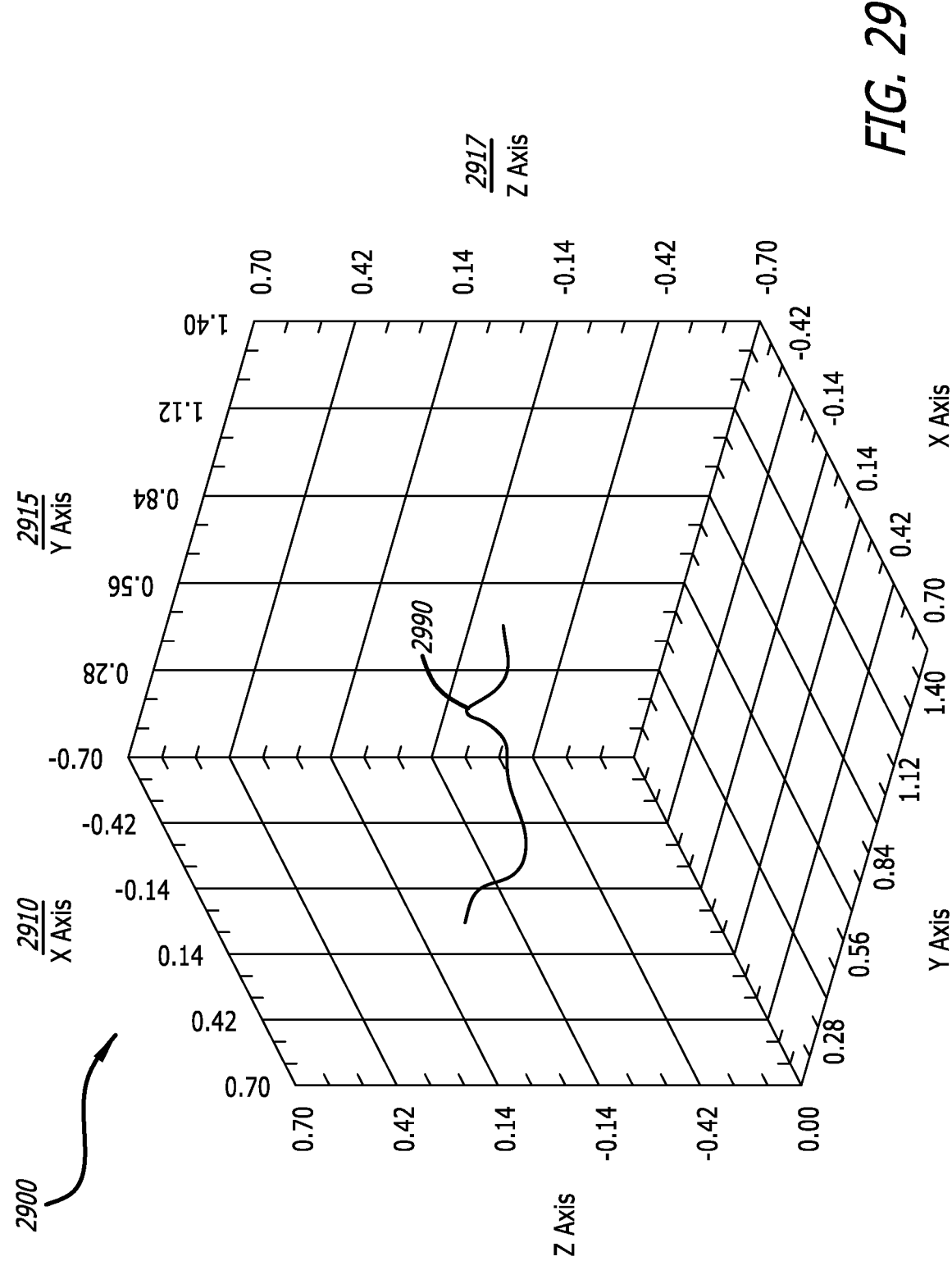
FIG. 29 is a 3D plot showing MFB twist distribution data along an MFB.

FIG. 29 is 3D plot 2900 showing MFB twist distribution data 2990 along the MFB using the data 2875 and/or data of step 2170. Plot 2900 may show the shape data that is calculated after calculating distributed twist. An image of distributed twist is not shown but may look exactly the same as data 2875, but with different numbers on the vertical axis. MFB twist distribution data 2990 may be the MFB twist distribution data along the MFB at step 2180 for all of the three offset fibers or for the MFB (e.g., part or all of length L) and optionally for the center fiber too. Plot 2900 has X axis 2910, Y axis 2915 and Z axis 2917 all showing measurements of vertical axis 2510 for the length of an MFB fiber from the fibers proximal end or base such as along horizontal axis 2315. Data 2990 shows a swing in direction from negative to positive in the X and Z axis; and a swing withing positive in the Y axis.

After step 2180 the shape of the sensor MFB, the MFB twist distribution data 2990 and/or a device the MFB can be integrated into (such as a guidewire) is then registered to and visualized with anatomical imaging to display in real-time the location and shape of the entire device within the patient during surgery. Shape, MFB twist distribution data and other calculated data may also be used for feedback control of robotically controlled medical devices. This shape includes or is the MFB twist distribution data along the MFB.

In some cases, step 2180 and/or process 2100 includes calculating MFB twist distribution data along the MFB using MFB twist distribution data of the OFDR phase data of the interrogation data. In some cases, step 2180 and/or process 2100 includes acquiring, measuring and/or calculating the MFB twist distribution data along an MFB while inputting a laser that scans a frequency range into the MFB.

Process 2100 may be using optical sensors to monitor the changes in the intensity, phase, polarization, wavelength, and/or transit time of light within the MFB (e.g., 2110-2150) that result from and thus are used to determine, measure or calculate temperature, strain, twist, pressure, and other parameters (e.g., 2160-2180).

Process 2100 and/or step 2190 may be repeated over time to calculate MFB twist distribution data in each of the optical fibers over time using the OFDR phase data to determine position, bend, and/or the MFB twist distribution data along the length of the MFB.

Figure 22:
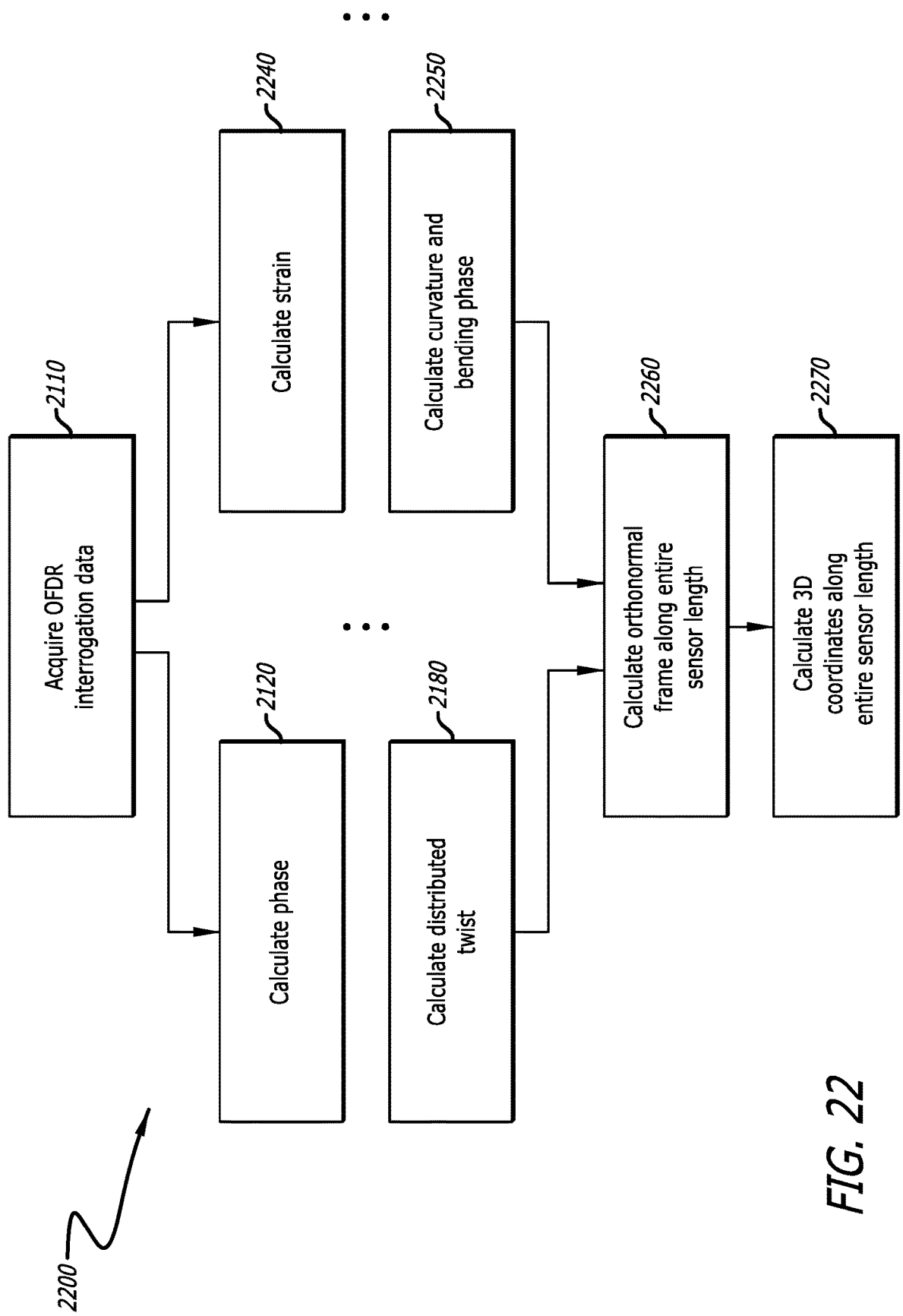
FIG. 22 is a flow chart of a process flow calculating 3-dimensional coordinates along an entire sensor length of an MFB using OFDR phase interrogation data.

FIG. 22 is a flow chart of a process flow 2200 for calculating 3-dimensional (3D) coordinates along an entire sensor length of an MFB using OFDR phase interrogation data. Flow 2200 may be performed by device 1000, interrogator 110 and/or system 140. The process flow 2200 starts at step 2110 and ends at step 2270, but the process may be cyclical in nature, such as by returning to step 2110 or 2260 after step 2270. Certain steps may not be shown in flow 2200. Flow 2200 may measure, determine or calculate the 3-dimensional (3D) coordinates along an entire sensor length of FIG. 1's main section 122 for shape sensing, or along the length of section 122 and section 124.

Process 2200 begins with step 2110 at which the OFDR interrogation data is acquired from an MFB. For process 2200, the OFDR interrogation data is acquired includes at least phase and strain.

After step 2110 of FIG. 22, process 2200 splits left to perform steps 2120-2180 of FIG. 21 and right to perform steps 2240-2150 of FIG. 22. Steps 2240-2150 may be similar to steps 2120-2180, except that steps 2240-2150 calculate curvature and bending deformation along the length of the MFB. For instance, step 2240 may be similar to step 2120 except the strain is calculated instead of phase. Then step 2250 may include steps 2130-2180, except for using strain (instead of phase) to calculate curvature and bending (instead of twist) deformation along the length of the MFB.

After steps 2180 and 2250, process 2200 continues to step 2260 where orthonormal frame is calculated along the entire sensor MFB length.

After step 2260, at step 2270 3D coordinates are calculated along the entire sensor MFB length using the orthonormal frame calculated at step 2260. In some cases, the description listed as step 2260 includes calculating Tangent, Normal and Binormal vectors at each location along the length of the MFB, and describing the 3D orientation of each location.

The use of Bragg gratings, Bragg wavelengths, strain and potentially temperature for generating interrogation data of an MFB herein can all be used to calculate curvature, bending direction, and twist of the MFB. In some cases, phase can be used in addition to these techniques, and replace a very small subset of the calculations within strain to calculate twist of an MFB as in process 2100 and steps 2120-2180 in process 2200. Phase can be calculated from the same optical interrogation data as strain, but they can be and use separate calculations as shown in process 2200. Strain data can be used to calculate curvature, bending direction, and twist of the MFB as in process 2100 and process 2200. But it can also be used only to calculate curvature and bending direction, while only phase can be used to calculate twist as in process 2100 and process 2200.

Described herein is technology (e.g., systems, devices and processes such as using device 100, interrogator 110 and/or system 140) for providing three-dimensional position and orientation data quasi-continuously along the length of a multi-fiber shape sensing bundle. The technology can be for calculating or measuring a position or twist that is relative to a fixed origin located at the MFB's proximal end, such as at the proximal end of MFB main section 122 or section 124. The technology can be for accurately measuring the distribution of twist in a spatially continuously manner along the shape sensing bundle MFB that is essential to producing accurate 3D shape and location measurements of the distal end of the MFB. The technology can be for using OFDR phase measurements from step 2110 or 2120 to compute at step 2180 a direct measurement of the twist displacement being applied continuously along the MFB's partial or entire length L. The twist measurement may then be further used as an input to a 3D shape calculation algorithm to accurately compute the shape, position, location, and orientation of the MFB and the device (e.g., surgical catheter or guide wire) into which it is integrated, such as at step 2260 or 2270. One nonlimiting implementation of the technology is utilizing the OFDR phase distributions from four or more fibers contained within the MFB, such as 3, 4, or 6 helically wrapped and one central fiber of an MFB, such as for process 2200 ore 2300. It is considered that more wrapped fibers may be used such as 7, 8, 9, 10, 12 and up to 20. If the central fiber phase distribution is subtracted from the mean phase distribution of three radially offset fibers, one can produce a temperature and axial-strain insensitive measurement of distributed phase, such as at step 2160. This temperature and axial-strain compensated twist-phase distribution may then be calibrated to produce a highly accurate distributed measurement or calculation of twist displacement, such as at step 2180. The calculation can be a MFB twist distribution data along the length of the MFB that provides three-dimensional position and orientation data quasi-continuously along the length of a multi-fiber shape sensing bundle. When integrated into medical devices such as catheters and endoscopes, the technology is a useful tool for surgical navigation as it can provide the location, shape, and orientation of the device in real-time and throughout the entire duration of a medical procedure or surgery. This enables surgeons and medical staff to navigate anatomy and perform procedures faster, safer, and with less or no use of harmful fluoroscopic imaging.

The technology improves the functioning of computers and provides a specialized computing device by being or including a specialized MFB and/or interrogator 110 (and optionally system 140) capable of performing a number of steps of process 2100 or 2200, such as step 2110 and/or 2120.

Descriptions herein of being "for" doing an action may mean that they are configured to and/or adapted to perform that action, such as for calculating MFB twist distribution data along an MFB using optical frequency domain reflectometry (OFDR) phase interrogation data.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for calculating MFB twist distribution data along a multi-fiber shape sensor bundle (MFB) using optical frequency domain reflectometry (OFDR) phase interrogation data, the method comprising:
   acquiring OFDR interferometric interrogation data from an MFB having at least three single core radially offset fibers helically wrapped about and rigidly adhered to a central single core fiber, wherein the at least three single core fibers and the central single core fiber include fiber Bragg gratings (FBGs);
   extracting current phase signal data from the OFDR interferometric interrogation data for each of the at least three radially offset fibers and the central fiber;
   calculating a change in phase between the current phase signal data and previously acquired reference phase signal data from the OFDR interferometric interrogation data for each of the at least three radially offset fibers and the central fiber;
   unwrapping the change in phase for each of the at least three radially offset fibers and the central fiber;
   accounting for FBG gap-induced unwrapping discontinuities in the change in phase for each of the at least three radially offset fibers and the central fiber to create FBG gap-mitigated phase differences for each of the at least three radially offset fibers and the central fiber;
   averaging the radially offset gap-mitigated phase differences of each of the at least three radially offset fibers and subtracting the center fiber gap-mitigated phase difference from the average to yield a twist-phase difference that is indicative of a distributed twist of the multi-fiber bundle;
   removing bending-induced changes from the twist-phase difference to create bend-compensated twist-phase difference distribution; and
   converting the bend-compensated twist-phase difference distribution from units of the OFDR interferometric interrogation data to units of twist to calculate MFB twist distribution data along the MFB.

2. The method of claim 1, wherein calculating MFB twist distribution data includes inputting the MFB twist distribution data for each of the at least three radially offset fibers and the central fiber into a 3D algorithm to calculate shape.

3. The method of claim 1, wherein calculating MFB twist distribution data includes making calculations with the phase difference data of each of the plurality of optical fibers over time using the OFDR phase data to calculate the MFB twist distribution data along the MFB using the MFB twist distribution data.

4. The method of claim 1, wherein calculating MFB twist distribution data does not include calculating position or bend using the phase difference data of the interrogation data.

5. The method of claim 1, wherein one of: the OFDR difference phase data does not include intensity, polarization, wavelength, or transit time of light in each of the optical fibers; or calculating does not include using interrogation data having intensity, polarization, wavelength, or transit time of light for the optical fibers.

6. The method of claim 1, wherein acquiring includes measuring the OFDR interferometric interrogation data while inputting a laser that scans a frequency range into the MFB; and wherein the MFB is a multi-fiber 3D shape sensor bundled.

7. The method of claim 1, wherein the MFB is integrated into a guidewire that is configured to be registered to and visualized with anatomical imaging to display in real-time a location and shape of the guide wire within a patient; and wherein the location and shape may be used for feedback control of robotically controlled medical devices.

8. The method of claim 1, wherein one of:
   a) at least a subset of FBGs in a first optical fiber overlaps a subset of gaps between FBGs from among FBGs in at least one other second optical fiber,
   b) at least a subset of FBGs in a first optical fiber overlaps a subset of gaps between FBGs from among FBGs in each of the other optical fibers, or
   c) the array of FBGs disposed within the core of each single-core optical fiber comprises a single elongated FBG running the entire length of a shape-sensing region of the FBG.

9. The method of claim 1, wherein the MFB has at least six single core fibers radially offset fibers helically wrapped about and rigidly adhered to the central single core fiber, wherein the at least six single core fibers include FBGs, wherein central single core fiber remains centrally-positioned with respect to the six other optical fibers.

10. A computing device comprising non-transitory computer instructions that when executed by a processor cause the processor to perform:
   acquiring OFDR interferometric interrogation data from a multi-fiber shape sensor bundle (MFB) having at least three single core radially offset fibers helically wrapped about and rigidly adhered to a central single core fiber, wherein the at least three single core fibers and the central single core fiber include fiber Bragg gratings (FBGs);
   extracting current phase signal data from the OFDR interferometric interrogation data for each of the at least three radially offset fibers and the central fiber;
   calculating a change in phase between the current phase signal data and previously acquired reference phase signal data from the OFDR interferometric interrogation data for each of the at least three radially offset fibers and the central fiber;
   unwrapping the change in phase for each of the at least three radially offset fibers and the central fiber;
   accounting for FBG gap-induced unwrapping discontinuities in the change in phase for each of the at least three radially offset fibers and the central fiber to create gap-mitigated phase differences for each of the at least three radially offset fibers and the central fiber; and
   averaging the radially offset gap-mitigated phase differences of each of the at least three radially offset fibers and subtracting the center fiber gap-mitigated phase difference from the average to yield a twist-phase difference that is indicative of a distributed twist of the multi-fiber bundle;
   removing bending-induced changes from the twist-phase difference to create bend-compensated twist-phase difference distribution;
   converting the bend-compensated twist-phase difference distribution from units of the OFDR interferometric interrogation data to units of twist to calculate MFB twist distribution data along the MFB.

11. The computer instructions of claim 10, wherein calculating MFB twist distribution data includes Inputting the MFB twist distribution data for each of the at least three radially offset fibers and the central fiber into a 3D algorithm to calculate shape.

12. The computer instructions of claim 10, wherein calculating MFB twist distribution data includes making calculations with the phase difference data of each of the plurality of optical fibers over time using the OFDR phase data to calculate the MFB twist distribution data along the MFB using the MFB twist distribution data.

13. The computer instructions of claim 10, wherein calculating MFB twist distribution data does not include calculating position or bend using the phase difference data of the interrogation data.

14. The computer instructions of claim 10, wherein one of: the OFDR difference phase data does not include intensity, polarization, wavelength, or transit time of light in each of the plurality of optical fibers; or calculating does not include using interrogation data having intensity, polarization, wavelength, or transit time of light for the plurality of optical fibers.

15. The computer instructions of claim 10, wherein acquiring includes measuring the OFDR interferometric interrogation data while inputting a laser that scans a frequency range into the MFB; and wherein the MFB is a multi-fiber 3D shape sensor bundled.

* * * * *